(12) United States Patent
Chiluvuri

(10) Patent No.: US 7,827,527 B1
(45) Date of Patent: Nov. 2, 2010

(54) SYSTEM AND METHOD OF APPLICATION DEVELOPMENT

(76) Inventor: Raju V. Chiluvuri, Ave-4, Street-5, Banjara Hills, H.N 297, Hyderabad, A.P (IN) 500 034

( * ) Notice: Subject to any disclaimer, the term of this patent is extended or adjusted under 35 U.S.C. 154(b) by 1578 days.

(21) Appl. No.: 10/951,066

(22) Filed: Sep. 27, 2004

Related U.S. Application Data

(60) Provisional application No. 60/544,212, filed on Feb. 12, 2004.

(51) Int. Cl.
*G06F 9/44* (2006.01)

(52) U.S. Cl. .................. 717/109; 717/104; 717/107; 717/111

(58) Field of Classification Search .................. None
See application file for complete search history.

(56) References Cited

U.S. PATENT DOCUMENTS

| | | | |
|---|---|---|---|
| 5,940,834 A * | 8/1999 | Pinard et al. ............... 707/102 |
| 6,053,951 A | 4/2000 | McDonald et al. ............ 717/1 |
| 6,093,215 A | 7/2000 | Buxton et al. ................ 717/1 |
| 6,539,420 B1 | 3/2003 | Fields et al. ................ 709/206 |
| 6,693,652 B1 | 2/2004 | Barrus et al. ................ 345/838 |
| 6,701,513 B1 | 3/2004 | Bailey ...................... 717/109 |
| 6,704,024 B2 * | 3/2004 | Robotham et al. .......... 345/581 |
| 2003/0097639 A1 * | 5/2003 | Niyogi et al. ............... 715/526 |

* cited by examiner

*Primary Examiner*—Chuck O Kendall
(74) *Attorney, Agent, or Firm*—AZ Patent Law Firm

(57) ABSTRACT

The present invention discloses a system, method and program code product for efficient component-based application development. Presentation code of a container component is generated by an integrated-components code generator (ICCG), which uses the class objects of component code generators (CCGs) as subcomponents. The CCGs, as standalone components, can generate the presentation code of the subcomponents by their code-generating method (CGM) during execution. The ICCG assemble and integrate the subcomponents' presentation code in run time and fill in the code necessary to establish communication between any two of subcomponents in the resultant web application code.

71 Claims, 19 Drawing Sheets

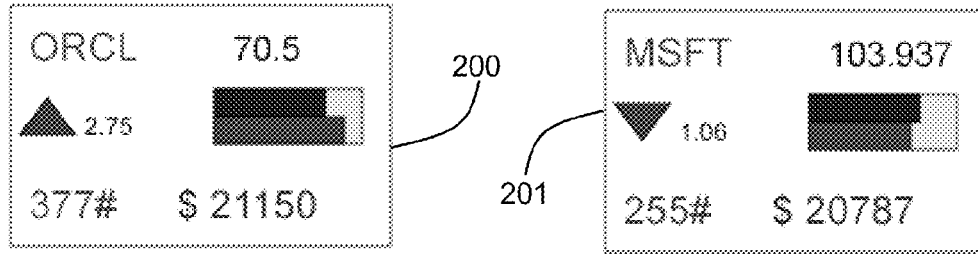

```
The Presentation Code (SVG-Code) to present the ORCL
                    Stock-quote
<rect style="fill:white;stroke:black;" x="0" y="0" width="205" height="130"/>
<text style="fill:red;font-size:16pt" x="10" y="30">ORCL</text>
<text style="fill:black;font-size:14pt" x="120" y="30">70.5</text>
<polygon style="fill:green;stroke:black;" points="20,50 35,70 5,70 20,50"/>
<text style="fill:blue;font-size:10pt" x="40" y="70">2.75</text>
<rect style="fill:yellow;stroke:black;" x="110" y="45" width="80" height="30"/>
<rect style="fill:maroon;stroke:black;" x="110" y="45" width="60" height="15"/>
<rect style="fill:red;stroke:black;" x="110" y="60" width="70" height="15"/>
<text style="fill:red;font-size:16pt" x="10" y="115">300#</text>
<text style="fill:darkgreen;font-size:16pt" x="90" y="115">
         <tspan style="fill:blue;font-size:16pt">$ </tspan>21150</text>
```

```
The Presentation Code (SVG-Code) to present the MSFT
                    Stock-quote
<rect style="fill:white;stroke:black;" x="0" y="0" width="205" height="130"/>
<text style="fill:red;font-size:16pt" x="10" y="30">MSFT</text>
<text style="fill:black;font-size:14pt" x="120" y="30">103.937</text>
<polygon style="fill:red;stroke:black;" points="20,70 35,50 5,50 20,70"/>
<text style="fill:blue;font-size:10pt" x="40" y="70">1.06</text>
<rect style="fill:yellow;stroke:black;" x="110" y="45" width="80" height="30"/>
<rect style="fill:maroon;stroke:black;" x="110" y="45" width="60" height="15"/>
<rect style="fill:red;stroke:black;" x="110" y="60" width="55" height="15"/>
<text style="fill:red;font-size:16pt" x="10" y="115">200#</text>
<text style="fill:darkgreen;font-size:16pt" x="90" y="115">
         <tspan style="fill:blue;font-size:16pt">$ </tspan>20787</text>
```

SYSTEM AND METHOD OF APPLICATION DEVELOPMENT

CROSS-REFERENCE TO RELATED APPLICATION

This patent application claims the priority from the provisional application 60/544,212, filed on Feb. 12, 2004.

REFERENCE TO COMPUTER PROGRAM LISTING, COMPACT DISC APPENDIX

A compact disc is included herewith and incorporated by reference herein having thereon computer program listing appendices in the ASCII uncompressed text format with ASCII carriage return, ASCII line feed and all control codes defined in ASCII, having computer compatibility with IBM PC/XT/AT or compatibles, having operating system compatibility with MS-Windows, being created on Sep. 26, 2004, with file names amended on Dec. 24, 2004, the compact disc including the following files and sizes:

- A. Application code (SVG) of RotateBanner, 34304 bytes;
- B. Application code (SVG) of Show_laywer, 37376 bytes;
- C. Application code (SVG) of Service_Registration_Class, 29696 bytes;
- D. Source code of AgileTemplate class, 2994 bytes;
- E. Source code of Rotate_banner in Java, 5967 bytes;
- F. Source code of Rotate_banner2 in Java, 6278 bytes;
- G. Source code of Show_layer in Java, 7088 bytes;
- H. Source code of RB_DDL_IntTemp in Java, 2438 bytes;
- I. Source code of rb_ddl_it for Stock-info in JSP, 1363 bytes;
- J. Source code of rb_ddl_it for Weather-info in JSP, 1363 bytes;
- K. Source code of RadioButtons in Java, 4265 bytes;
- L. Source code of CheckBoxes in Java, 4265 bytes;
- M. Source code of RadioButtons2 in Java, 6081 bytes;
- N. Source code of RB_RB_IntTemp in Java, 1681 bytes;
- O. Source code of RB_RB_IntTemp2 in Java, 3961 bytes;
- P. Source code of subcomponents.jsp include file for test JSP files, 4478 bytes;
- Q. Source code of sl_cb_test.jsp in JSP, 1761 bytes;
- R. Source code of rb_rb_test.jsp in JSP, 1636 bytes; and
- S. Source code of rb_rb_test3.jsp in JSP, 2166 bytes

COPYRIGHT NOTICE AND USE PERMISSION

A portion of the disclosure of this patent document contains material that is subject to copyright protection. The copyright owner has no objection to the facsimile reproduction by anyone of the patent document or the patent disclosure as it appears in the U.S. Patent and Trademark Office patent file or records, but otherwise reserves all copyright rights whatsoever. The following notice applies to the software and data as described below and in the drawings hereto: Copyright 2003, Raju Chiluvuri, All Rights Reserved.

FIELD OF THE INVENTION

This invention relates to application development, and particularly to software development method for generating platform-compatible code of web components.

BACKGROUND OF THE INVENTION

The world-wide-web (WWW) interface protocol over Internet provides a convenient mechanism for distributing information from web servers to web users at client computers which are connected to the web servers through Internet or private networks.

When a web server receives a request from a client computer for a dynamic web page, it runs the Java Server Pages (JSP) or Servlet associated with the URL and passes the browser information and other parameters to the JSP. This Servlet or CGI-executable may access and retrieve data stored in the web server or other connected computers to generate a web page. When the data in the real world is changed or updated, the information shown on the web page necessarily changes.

Computer applications often use graphics to present information and use Graphic User Interface (GUI) as the interface between computers and their users. While text interface is still in use, it is not favored. GUI is characterized by use of menus selection lists, popup-windows, and visual-presentation components such as charts, trees, graphs and maps. Because of the intensive use of graphics, it may require considerable effort to develop and modify the contents of web pages.

Commercially available web browsers support many presentation technologies such as Dynamic Hypertext Markup Language (DHTML), Extensible Hypertext Markup Language (XHTML) Document Object Model (DOM), JavaScript, Cascading Style Sheets (CSS), extensible Stylesheet Language (XSL), three-dimensional modeling language (e.g., X3D), and Scalable Vector Graphics (SVG), Synchronized Multimedia Integration Language (SMIL), and XForms. The use of such a combination of programming languages makes programming more complex. To present a component on a web page, the JSP/Servlet must create the code to present the component and include the code in the file of the web page. Programming for Internet applications requires experience in both Java (or other equivalent languages) for the server, and DHTML/JavaScript and SVG/XAML for the client computer. It might be necessary to create and debug several hundred to thousands of lines of code to present a web page.

In addition, different browsers require different DHTML/JavaScript code to present a component, and, therefore, different web pages must be developed for different browsers and devices to present the same component. To develop a more complicated web application, application developers often need to write code in appropriate languages and presentation technologies such as DHTML, DOM, JavaScript, CSS, XML, XSL, SVG and XAML for each specific browser.

Furthermore, when plural components are integrated to build a larger application component, application developers are required to manually code to integrate the components. The integration code allows the components to work together collaboratively.

Finally, information critical to business decisions constantly changes real-time, and, therefore, updating web pages by rewriting presentation code of the web page by the conventional method is neither realistic nor economical. Various attempts are made to speed up the process of application development in this and other similar environments for same or similar reasons.

A method of reuse of image data is described in U.S. Pat. No. 6,539,420 B1, filed Mar. 25, 2003, titled "Distribution Mechanism for Reuse of Web Based Image Data", granted to Fields et al. This method describes a technology of reuse of image data in a distributed computer network at a web server in response to a request from a client browser for a web page. A template defining a composite image is retrieved and at least one image object identified by the template is retrieved from another location to the web server followed by a given image transform and the transformed image object being mapped into the composite image according to the template. The method is limited to web-based image data.

A method for creating graphical programs is described in U.S. Pat. No. 6,053,951, filed on Apr. 25, 2000, titled "Man/Machine Interface Graphical Code Generation Wizard for Automatically Creating MMI Graphical Programs", granted to McDonald et al. This application describes a computer-implemented system and method for automatically generating graphical code in a graphical programming system. The graphical code generation wizard selects a graphical code template stored in the computer memory in response to the control arranged by the user and configures the graphical code template with the parameter values selected by the user, and then creates an association, which is able to be unlocked by the user, between the control and the configured graphical code.

A method for automatic web page creation of an organizational directory for use in an Internet and Intranet environment is disclosed in U.S. Pat. No. 5,940,834, filed on Aug. 17, 1999, titled "Automatic Web Page Generator", and granted to Debbie Pinard and Richard Deadman. The web page directory is created from data stored in the directory application component of the web page generator and, after being placed on a web server, allows any individual who has network access to the web server offering the web page to view the directory information in a web page format. This method is not intended to create any web component.

A method for building templates is disclosed in U.S. Pat. No. 6,093,215, filed on Jul. 25, 2000, titled "Method and Apparatus for Building Templates in a Component System", and granted to Jeffrey J. Buxton and Eric S. Portner. A component customization and distribution system in an object oriented environment provides a template builder utility which enables selection of a base component, modification to the state of persistent data of the base component, storing of the modification to the persistent data of the base component into a template format, and user-password locking of the template. The template builder utility further enables the generation of user-defined instructions as part of the template and generation of a template distribution pack, for which the generation methods are also disclosed.

There is still a need for a system and method for developing components efficiently and a method for using pre-built components to build larger components or applications.

SUMMARY OF THE INVENTION

The present invention discloses a method, system and computer program product to create application code of an application component using code-generating programs: component code generator (CCG), application component code generator (ACCG) and Integrated-Components Code Generator (ICCG), When any of code-generating programs built for a component is run in the first platform, they generate proper presentation code and send the code to a second platform for rendering. The first platform and the second platform may reside in same computer hardware.

A CCG of a component, upon being executed, generates the presentation code of the component. The CCG is preferably implemented in Java class derived from an abstract base class AgileTemplate, which comprises an abstract code-generating method (CGM). In the alternative, the CCG may be implemented in its own class. CCGs can be pre-built for frequently used basic components as GUI controls, dials, trees, maps, and charts. When the class objects of the CCGs are instantiated in the first platform, and the CGMs of the instantiated objects are called, the CGMs generate the presentation code, respectively, for the corresponding basic components. Therefore, it is unnecessary to develop the presentation code of basic component line by line. The CCGs of pre-built components are reusable, and can be used by other container components as subcomponents.

An ACCG of a component is also a program or a portion of program capable of generating of presentation code of the component. The ACCG class, like CCG class, is preferably also derived from an abstract base class AgileTemplate except that the ACCG also contains code to treat application logic (also known as business logic). Therefore, ACCG is a special CCG. Alternatively, the ACCG may be implemented in its own class or in non-class. Like CCG, the ACCG also contains its own CGM in the class definition. Therefore, when the CGM of an instantiated ACCG object is called, the ACCG generates the presentation code of the component. When an ACCG is implemented in object class, the ACCG can be used by a container CCG or ACCG as a subcomponent.

The application logic portion of the ACCG code may contain the code for variables and service methods for retrieving application data from a computer media, evaluating the performance of business systems, and modeling real systems. By calling the service methods implemented for application logic of an instantiated ACCG object, application data can be initialized, processed, and updated in run time. When application data is ready, the CGM of the ACCG is called to generate the presentation code for the component using the processed and updated application data. Therefore, up-to-date presentation code can be created for the component, reflecting the application data that changes constantly.

The presentation code of an application component generated by a CCG object of a subcomponent supports service methods that can be called to access the application component's services (or the subcomponent service) from other application components or external application components (that are not part of the application component).

ICCG is designed for an application component to use at least one CCG object of subcomponent in generating the presentation code of the subcomponent.

An ICCG may be implemented in AgileTemplate class or its own class. An ICCG is used to generate application code for a container component using one or more subcomponents, each of which is represented by a CCG. The ICCG contains the methods or any equivalent code to input or import, or instantiate or initialize CCG class objects of the subcomponents and the code to call the CGM of the objects. When the ICCG is run, it calls the CGM of the CCG objects to generate the presentation code for each of the subcomponents, and place the presentation code in the proper locations in the resultant application.

The ICCG not only contain the code to place the presentation code generated by the CCG objects in proper locations, but also contains code of integration logic, which is responsible for generating the several lines of special application code ("integration code") which is used by the application component or subcomponents to establish communication so all the components and subcomponents in the resultant application can work in a collaborative way. The code of integration logic (1) call service methods of the CCG objects of subcomponent to get information such as the names of service methods and event triggers of the subcomponent used in the resultant application code and use the information to write integration code to allow the application components to communicate with the subcomponent, (2) choose names for callback (trigger) functions and use pass the name to the subcomponent CCG so that it can generate part of integration code in JavaScript or other language in the application, (3) service methods which, upon being called, get information such as the names of the service methods of external application components and use the information to write the integration code so that the component call the service methods of external application components, and (4) service method which, upon being executed, use the information such as the names of the service methods of external application components to generate integration code so that the application components and the external application components can communicate and collaborate with each other.

The integration code allows application component, subcomponent, and external application component in the resultant application to work in a collaborative way.

To properly integrate the subcomponents generated by the CCG objects, the ICCG object exchange data with the CCG objects of the subcomponents. The data exchange may be realized by using simple get and set methods of the CCG objects, by several lines of special code which, upon being run, generates part of integration code which is used by the application component and the subcomponents to exchange data. The mechanisms of data exchange include use of XML string, hidden variables, and common variables, which are used by more than one component/subcomponent.

An ICCG, in the simplest form, contain only the code to import CCG objects and the code to integrate the subcomponents the CCG objects represent.

Preferably, ICCG may be designed to accept CCG objects of subcomponents by the set methods (i.e. constructors or initialization methods) in Java class. To integrate subcomponents of input CCG, the container application component may need to know the component integration data of the input CCG. The CCG may contain service methods, which are used by the ICCG to access, share, and validate component integration data. In the alternative, the CCG of input subcomponent is derived from an abstract component class, which may be a subclass of AgileTemplate class. The abstract component class is a distinctive indication of a particular component class. Besides this requirement, the CCG may include any presentation logic, any business logic, multiple components, multiple levels of components in the hierarchy tree, and customization information to meet the needs of the application. Moreover, the component integration data used by one subcomponent may also be shared/used by other subcomponents in the resultant application.

A functional ICCG together with the required input CCG may serve as an input component for other ICCGs. An instantiated and fully initialized ICCG object may be used to create the presentation code of a container component, or used as a subcomponent by another CCG to build a larger component in an application, or used by another ICCG to build a large component or application. This simple hierarchical integration process can be repeatedly used to build larger and larger application components or applications.

By using the method of the present invention, subcomponents of input CCGs can be automatically integrated by an ICCG during execution. ICCGs use the CCG class's component integration data without imposing other limitations on the subcomponents and their presentation code. Therefore, input CCGs can be created and tested independently, refined quickly, or replaced seamlessly. Custom ICCGs can be built by assembling and integrating many code generators. Reusable ICCGs can be created for popular applications such as OLAP-analysis, GPS-navigation, visual simulation or representation of dynamic systems, and shopping-cart. Custom components can be plugged in the ICCGs by importation to generate applications or application components.

The method of the present invention provides several advantages. Some advantages flow from the ability to preserve the independence of the components or ACCGs and the ability to create computer programs to assemble the components in a flexible way.

In one aspect, the method of the present invention can be used to make application development easier. An application can be divided into many components, which can be developed and tested independently from each other. The components can be automatically assembled to form the application. In another aspect, the method can be leveraged to substantially cut the development effort of the ICCGs. To reduce coding effort, application developers can use pre-built reusable CCGs in class libraries such as GUI-Controls, Menus, Meters, Dials, Charts, Trees, and Maps.

In yet another aspect, the method of the present invention can be used to shorten the development period for a new application. CCGs can be integrated seamlessly to build larger CCGs. This allows application developers to build CCGs independently, and use them to build CCGs for larger components. To build larger CCG, the developers can use subcomponent CCGs for generating presentation code of the subcomponents and write code of integration logic for generating integration code. When a variety of CCGs are available as subcomponents, the time for building the new application using those available subcomponents is less.

In further another aspect, the CCG/ACCG of subcomponents can be easily refined or modified to meet constantly changing business needs. The service methods of the components can be designed to provide standardized interface based on the component integration data of the components. As a result, such components are portable from application to application.

Those and other aspects of features of the present invention will become apparent to those skilled in the art after a reading of the following detailed description of the invention together with the drawings.

BRIEF DESCRIPTION OF THE DRAWINGS

FIG. 2a shows the presentation code for showing a stock quote for ticker ORCL;

DETAILED DESCRIPTION OF THE INVENTION

A. Definitions

Figure 1:
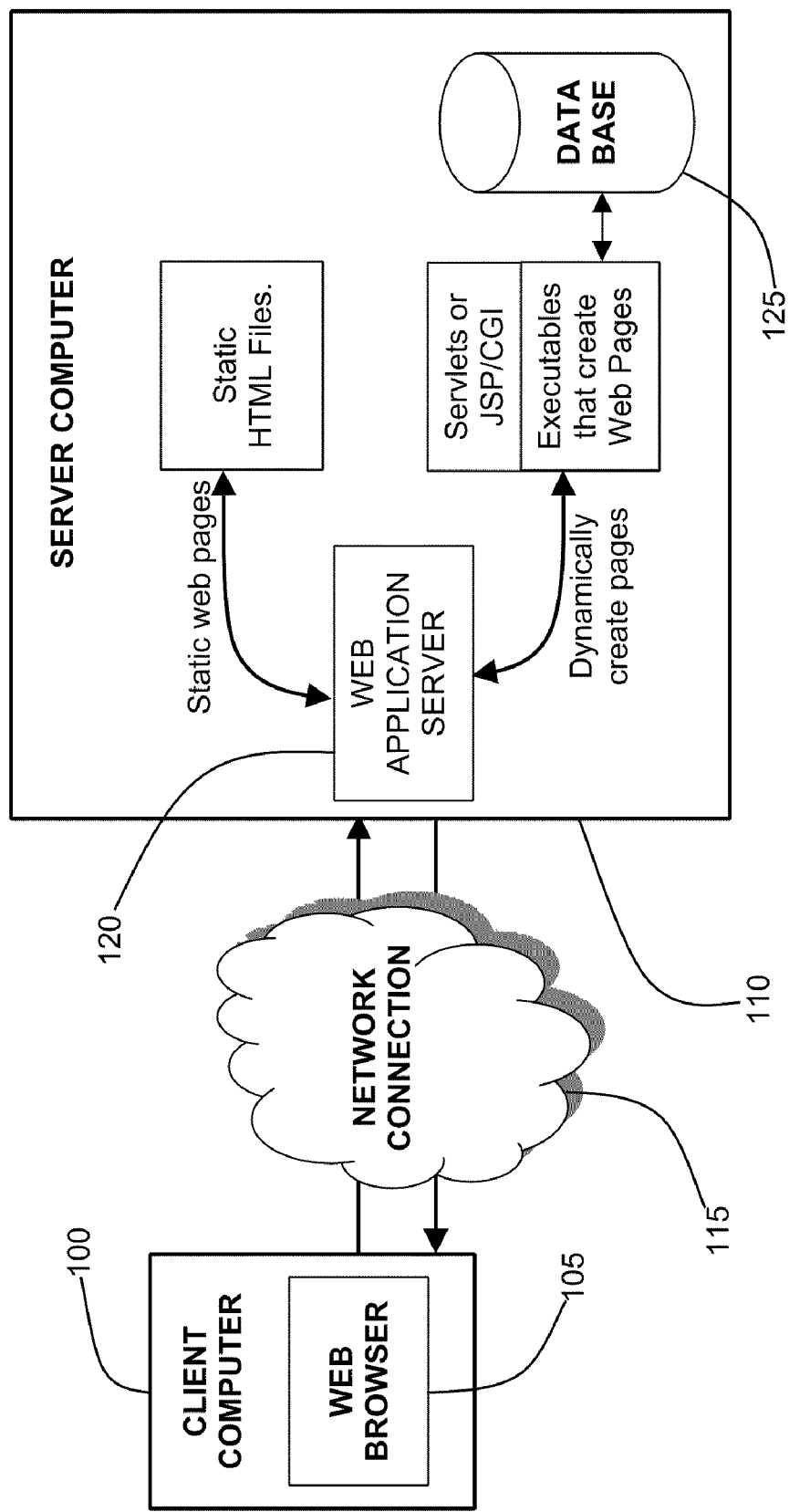
FIG. 1 shows the system for implementing the method of the software development according to the present invention.

Following definitions are applied in the construction of the disclosure and attendant claims.

An "application" is a program or set of cooperating programs that enable a user of a computer system to accomplish some task or set of tasks. It includes applications run under a platform such as browser, activeX viewer or virtual machine (e.g., Java Virtual Machine). It means the entire document and referenced files, which are sent to the rendering platform.

"Application component" (or "component") is an object instance that contains all the business intelligence to support a specific function or feature of the application. Many applications use graphical components to simulate or model real system and interactions of real objects. An example of application component is a temperature-reading meter, which contains the code to present current temperature, handling user events, and supporting service methods, which might be used by external code or other application components in order to read and/or update the temperature. A component may have subcomponents, e.g. a copier may have a sorter and a feeder attached to it. Because component and subcomponent are relative concepts, a component becomes a subcomponent when it is used by another component. Therefore, component may mean subcomponent when its relative relationship changes in a context. A container component is a target component to be built.

"eXtensible Markup Language" (XML) is a specification for designing formats for text data that allows for text objects to be organized into hierarchies (i.e., XML documents). XML allows web developers to create customized tags that offer flexibility in organizing and presenting information.

A "browser" means any HTML-rendering application. It means part of computer operating system if it is integrated with the operating system.

A "network connection" means any kind of IP network or equivalents, including Internet, Intranet, private network, LAN, WAN, and wireless network and any combinations thereof that allow two connected computers to exchange data according to an IP protocol or equivalent. It also includes the loopback of a computer when a server and a client reside in the same computer.

"Presentation code" is a block or several lines of code to render a component in a web browser or a viewer (or equivalent) at the client computer. This code can contain any combination of the languages and technologies. Furthermore, presentation code includes the application code, which is used to interface with other computer devices or to represent the state of machine.

"Component Code Generator" (CCG) is a computer program built for a component in any suitable language. It contains the code-generating method (CGM). Upon execution, the CGM of the CCG generates presentation code to present the component under a suitable platform.

"Application Component Code Generator" (ACCG) is a CCG that contains the code to implement application logic. An ACCG is a special CCG.

"Integrated-Components Code Generator" (ICCG) is a CCG that contains several lines of special code. When an ICCG is run to generate an application component, the special code is responsible for generating code statements known as integration code, which allows subcomponents/component in the resultant application to communicate with each other. Integration code is responsible for integrating the component/subcomponents. An ICCG is a special CCG.

"Component integration data" are the necessary information a container CCG needs when its object interacts with the CCG object of an input subcomponent. It does not necessarily mean class type even though it is closely related to class definition. In a shopping-cart and shopping item example, when a user selects an item on the computer screen, the shopping item (e.g., the subcomponent object) in the application causes the shopping-cart (the container component object) to update the invoice/purchase statement. The container CCG needs to generate proper integration code in order for the subcomponent shopping-item to call the service method of the subcomponent of the invoice/statement, when user selects the shopping-item. To accomplish this, the container CCG interacts with subcomponent CCGs on the basis of their component class to access the component integration data. The container CCG uses the data to generate the integration code.

B. Object-Oriented Programming

Object-Oriented Programming (OOP) languages, such as java, support a concept called classes. A class is a module of code that generally contains (1) a set of data variables to store data and reference to other objects, (2) a set of methods or functions to operate on the data, (3) methods for providing access to the services defined in classes, (4) methods for setting and changing the objects' data, and (5) methods for reading objects' data.

Object-oriented programming techniques involve the definition, creation, use and destruction of "objects". These objects are entities comprising data elements or attributes, and methods or functions, which manipulate the data elements. Objects can be created, used and deleted as if they were a single item. The attributes and methods enable objects to model virtually any real-world entity in terms of its characteristics, which can be represented by the data elements, and its behavior, which can be represented by its data manipulation functions. Objects are defined by "classes" which act as templates that instruct the compiler to construct actual objects. A class may, for example, specify the number and type of data variables and the way of manipulating the data. When an object-oriented program is compiled, the class code is compiled into the program, but no objects exist. An object is created by the program in runtime by calling a special function, constructor, which uses the corresponding class definition and additional information, such as arguments provided during object creation, to construct the object. When an object is created at runtime, memory is allotted and data structures are created. Objects are destroyed by calling a special function called destructor. Objects may be used by using their data and invoking their functions.

Class may support a rich set of methods to initialize the data variables and also to read the variables. Also, it supports methods, which can be used to request (or access) the services of the object, which is an instance of the class. For example, a sample drawing-class for a pie chart, which draws a pie chart, may contain variables: an array of floats, an array of strings, and a title string. The class may support methods to initialize these variables and a service method that draws the pie chart using the data. Users can instantiate a pie chart object and initialize the data using the supported methods; and then use the service method to draw the pie chart.

The major benefits of object-oriented programming techniques arise out of three basic principles; encapsulation, polymorphism and inheritance. More specifically, objects can be designed to hide, or encapsulate, all, or a portion of, the internal data structure and the internal functions. A program developer can define objects in which all or some of the attributes and all or some of the related functions are considered "private" or for use only by the object itself. Other data or functions can be declared "public" or available for use by other objects. Access to the private variables by other objects can be controlled by defining public functions for an object, which accesses the object's private data. The public functions form a controlled and consistent interface between the private data and the "outside" world. Any attempt to write program code that directly accesses the private variables causes the compiler to generate an error during program compilation, which error stops the compilation process and prevents the program from being run.

Inheritance allows software developers to easily reuse pre-existing program source code and to avoid creating software from scratch. It allows a software developer to declare classes and their instantiated objects as related to each other. When a class is designated as a subclass of the base class, the subclass "inherits" and has access to all of the public functions of its base class just as if the functions were declared in the subclass. Alternatively, a subclass can override some or all of its inherited functions or modify some or all of its inherited functions merely by defining a new function with the same form. Overriding or modification of a function in the subclass does not alter the function in the base class. The creation of a new class by selectively modifying the functions of another class allows the software developers to easily customize existing code to meet their particular needs.

Moreover, many components are essentially Java objects that conform to an object model such as Microsoft's Component Object Model. An object module is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object modules are useful in contexts where all objects in a given system need to conform to a given protocol governing these parameters. Most of the object-oriented languages, including the C++ programming language, do not specify true object modules, but merely specify syntax and semantics of a basic object implementation without specifying the rules that unify object systems.

In this present invention, one of the important features is the use of an abstract code-generating method for generating browser-compatible presentation code. A super class supports, among others, the code-generating method. The sub-classes derived from the super class inherit the behaviors and characters of the method.

C. The System for Application Development

The system (FIG. 1) for web application development in accordance with the present invention comprises a client computer 100 running an operating system (not shown) and a web browser 105, a server computer 110, and a network connection 115 between the client computer 100 and the server computer 110 so that the client computer 100 and the server computer 110 can exchange data according to an Internet communication protocol such as Hypertext Transfer Protocol (HTTP) or File Transfer Protocol (FTP). The server computer 110 hosts a web application server 120, which runs Servlet or JSP and/or has a Common Getaway Interface (CGI). The server computer 110 may optionally run a database server 125 or similar data base application. The web browser 105 uses a URL (the virtual address of the server) to locate the web application server 120 and to request a web page. If the URL points to a static web page, the server computer 110 returns the page in appropriate code. If the URL points to an executable (CGI or JSP/ASP.), the request will cause the server computer 110 to run the executable, which creates a web page dynamically.

The client computer 100 includes a central processing unit (CPU), a random access memory (RAM) for temporary storage of information, and a read only memory (ROM) for permanent storage of information. A bus, which is controlled by a bus controller, interconnects the components of the computer system. Secondary storage may be provided by diskette, CD ROM, hard drive, flash memory cards (by serial or USB or other connections), and tape drive. The diskette drive, CD ROM, and hard disk are connected to the bus by respective controllers; and the RAM is controlled by a memory controller. An interrupt controller is used for receiving and processing various interruption signals from any of the system components.

The client computer 100 also includes a communication adapter that allows the system to be interconnected to a local area network (LAN) or a wide area network (WAN) schematically illustrated by the bus and network connection.

Operation of the both the client computer 100 and the server computer 110 is generally controlled and coordinated by operating system software, such as the Microsoft Windows 95, 98, 2000, ME, XP and NT from Microsoft Corp., Redmond, Wash., Sun OS/2, and Apple OS 10 from Apple Computer Systems, Inc. Cupertino, Calif., and Linux from RedHat Inc, Durham, N.C. The operating system controls allocation of system resources and performs tasks of processing scheduling, memory management, networking, and input and output services. The operating system resident in system memory and running on CPU coordinates the operation of the other elements of the computer. The present invention may be implemented with any of the commercially available operating systems including OS/2, UNIX, Windows 95, 98, 2000, ME, XP, and NT, and DOS.

A platform such as viewer, virtual machine, browser, and any HTML-rendering application on the client computer 100 is necessary for use of the present invention. Commercial browsers include Internet Explorer from Microsoft Corporation and Netscape from Netscape Communication Corporation. Other browsers such as America Online browser are also available. Because graphic presentation code produced by the method disclosed in the present invention is displayed under an SVG viewer, it is therefore necessary to load an SVG viewer as a plug-in component of the browser. While all well-known browsers are not part of any of the commercially available operating systems, they can be merged into operating systems. For example, SVG viewer is analogous to Windows-OS to run enterprise applications; and SVG/JavaScript is analogous to programming languages such as Visual Basic or Java. Next generation Microsoft-OS code-named Longhorn and IE-browser support Avalon/WVG and XAML. The WVG and XAML are Microsoft's version of XML based graphics technology similar to SVG. Avalon is an underline graphical technology which is much more powerful than SVG viewer. Therefore, the present invention is useful not only in web application development but also in general software application development.

The server computer 110, as is well known in the art, is a computer that is connected to the client computer 100 through Intranet, local network, WAN or wireless in accordance to an Internet Protocol (IP). The server computer 110 generally has similar components of the client computer 100 even though some of the components such as floppy disk, CD ROM drive and display may be dispensed with. The server computer 110 is capable of sending web pages to the client computer 100 in HTML format. HTML is a markup system used to create web pages that are portable from platform to platform. To send a web page, the two computers use the Internet HTTP, which specifies how information is exchanged between the client and the server. HTTP is an application that is designed to conform to International Standard ISO 8879-Standard Generalized Markup Language. HTML and HTTP standards are managed by an Industry Consortium, the World Wide Web Consortium (W3C) jointly hosted by the Massachusetts Institute of Technology Laboratory for Computer Science [MIT/LCS] in the United States, the Institut National de Recherche en Informatique [INRIA] in Europe, and the Keio University Shonan Fujisawa Campus in Asia.

In one of the preferred embodiments, the server computer 110 supports the Common Gateway Interface (CGI) for running CGI programs. CGI is a publicly available method, which is used by web servers and web clients to mediate interaction between them.

In practicing this invention, it is often desirable to use the network connection 115 which may include Internet and the WWW infrastructure in whole or in part. The WWW is a collection of servers on an IP (Internet Protocol) network, such as the Internet, an Intranet, or an Extranet. The web servers on WWW utilize the HTTP for changing information. However, the invention may be practiced in private networks rendered by serial cable connection, leased phone line, and wireless networks without using the WWW.

The system described above is just one example of a suitable software development environment and is not intended to suggest any limitation as to the scope of use or functionality of the invention. Neither should the client computer 100 and the server computer 110 be interpreted as having any dependency or requirement relating to any one or combination of components used in the present invention. The invention may be practiced in cell phones and palm devices that run SVG viewer. Since the platform supports Application Peripherals Interface (API), the invention can be used to control other hardware devices.

In software development environment, the server computer 110 and the client computer 100 may reside in the same computer unit. This is especially straightforward in system running operating system such as Windows NT, XP, Unix and Linux. In such a system, a web server application can be launched for hosting web sites. At the same time, a web client can also be launched so that the client can access the web server through loopback. In this situation, the ordinary network connection is unnecessary. This system is ideal for software development using the technique of the present invention.

Moreover, if the web browser 105 is merged into the operating system, the system might be reduced to one single standalone computer even through the details in operating such system depend on how the new system is implemented. Therefore, the system for application development is intended to cover both the single computer and single computer without independent browser. In this situation, the client computer 100 should be construed as a logical computer. In the system where a browser is merged into the operating system, browser shall mean the part of the component of the operating system that performs browser's functions.

D. Presentation Platform and Presentation Code

Figure 2B:
FIG. 2b shows the presentation code created by an ACCG to display stock information.

Presentation code is a block or several lines of code to render a component in a web browser or a viewer at the client computer. This code may be generated by a CCG at the server and be sent to the client computer in the SVG language, and it must be compatible with the requesting browser. Some sample components are shown in FIGS. 2a, 2b, and 3a-3d. FIG. 2a shows the SVG code for two components 202 and 203. The code included in a SVG document displays components 200 and 201 respectively. FIG. 2b shows three components: a table 210, a line chart 211 and a bar chart 212.

The presentation code of the component on a web page may contain any combination of the languages that are understood and used by the requesting browser or viewer. The languages include HTML, XHTML, DHTML, JavaScript, CSS, SVG, DOM, XML/XSL, X3D, Xforms, MathML, ChemML, SMIL, VRML, and VML. Presentation code may contain data in XML format, and variables, program code in any of the supported languages and programming technologies.

Although different languages can coexist in the same document, logically they may be independent. In an SVG document, JavaScript code and SVG code coexist with clear markings to identify each code section. Each JavaScript code section is marked by tag <script type="text/ecmascript"> and tag </script>, while the SVG code may be marked by <svg> and </svg>. A section of code in a particular programming language might be executed by the engine that is specific for the language.

It is permissible to use a method to include the component class definitions and other JavaScript code such as JavaScript methods of a component in an external file (as in example RadiobuttonList_v1_0.js). And an external file may be included by using statements like <script xlink:href="GUIcomp_class_version1_1.js"/> and <script xlink:href="RadiobuttonList_v1_0.js" language="text/ecmascript"/>. Therefore, SVG document means SVG code page and all the external files incorporated by reference. Likewise, HTML document or page also includes all image files and external files incorporated by reference.

Code sections in JavaScript may be included at any location in the SVG document because all variables and function names in JavaScript are global. JavaScript code may be placed in a separate file, which is referenced in an SVG document, as shown above. However, implementations in different platforms (e.g., viewers or browsers) may require different approaches to achieving the same result.

Elements in SVG can be grouped using tags such as "g" and "svg". The X and Y coordinates of a component on the screen may be determined by the values of enclosing SVG group element in transform='translate (X Y)'. If the component contains subcomponents, the subcomponents are placed in sub-SVG groups. The X and Y coordinates of these sub-SVG groups are given with respect to the top-left corner of the enclosing SVG group.

Different sections of code in different languages on a web page may collaborate and communicate with each other. Generally, a programming language such as JavaScript is used to support interactivity, which makes the component intelligent and context-sensitive. Components on a web page may exchange notifications (signals) and call each other's service methods.

SVG graphics elements can be associated with JavaScript functions as user action listeners, which are called when specified action occurs. The following sample code shows how an onclick listener can be set on an SVG graphic element:

<g id="name_id" onclick="my_alert("hot spot")"><text>HotSpot</text></g>

Upon clicking on the text element "hot spot", the SVG element calls onclick listener function my_alert( ). Conversely, JavaScript code may be used to access SVG elements by using their id names and manipulate their properties or attributes by changing their values. For example, JavaScript functions can use "name_id" to locate the SVG element and change its attributes. Since the IDs of the SVG elements are global, any JavaScript function in the SVG document can use the IDs to access the graphical elements and change their attributes.

The following SVG code represents a square and a Text "USA" next to it:

<g transform='translate(5 5)'
onmouseover='change_color("red")'
onmouseout='change_color("white")'>
<text x='20' y='20' id='txt1' > USA</text>
<rect x='5' y='10' width='10' height='10' id='rect1'
stroke-width='1' stroke='black' fill='white'/>
</g>

The <rect> statement represents a rectangle image of the size given by "width" and "height", and places the image at the location given by 'x' and 'y' attributes. Any JavaScript function in the SVG document can access the elements using their IDs: 'txt1' and 'rect1'. The coordinates are with respect to top left corner of its container group.

JavaScript code can be included in the SVG code of the component code to change the location of the component on the screen. At any time, X and Y coordinates of the component, as defined by the values in statement transform='translate (X Y)', may be changed by using JavaScript functions, thereby moving the component to a new location on the application window in real time.

Event listeners may be placed for SVG elements. The above group element has two event listeners, one for the event onmouseover (mouse moving over the graphic element) and one for onmouseout (mouse moving away from the graphic element). In this example, both of the events call the same JavaScript function with different parameters. This function must be included somewhere in the SVG document or any of the incorporated files.

The following code is presented to show a sample implementation of the function, which changes the color of Rect and Text elements to "red" when the mouse is moved over their elements, and restores their original colors when the mouse is moved off the elements.

<script type='text/ecmascript'>
<![CDATA[
function change_color(col) {
var svgobj=SVG_Document.getElementByld('rect1');
(svgobj.getStyle( )).setProperty ('fill', col);
var svgobj=SVG_Document.getElementByld('txt1');
if (col=='red')
(svgobj.getStyle( )).setProperty('fill', 'red');
else
(svgobj.getStyle( )).setProperty('fill', 'black');
}
]]>
</script>

This function uses global variable, SVG_Document, which is initialized as the root document, to find the SVG elements. This function uses the IDs to access and manipulate the color attributes. The example shows how SVG elements and JavaScript work together. This feature of using programming code and graphical elements to present components in a cooperative way is used to create code to present functional application component. Other languages and technologies may be used in the SVG document.

E. Structure and Features of Presentation Code of Components

Class implementation of the presentation code can increase performance efficiency although it is not required to implement them as classes. Class implementation offers two features. It is helpful to the maintenance of good code structure and class definitions can be used to encapsulate data objects and service methods. Therefore, it is preferable that the presentation code of basic components is implemented in object classes. Configuration information, state information, and behavior information can be placed in classes' variables and methods. If a particular component is presented multiple times in the SVG document, the web page needs the class definition code only in the first instance, and just reuse the same class definition code in all other instances. By way of example, when a web page displays multiple pie charts, the page needs to include the class definition code of a pie chart only once. An object can be instantiated with specific data for each of the additional charts.

One of the objectives of designing presentation code is to encapsulate the component's functions such as data access, system modeling, system performance analysis, presentation of application data, interactivity, animation, data processing, data updates, event triggers, and handlers. While JavaScript is not a perfect object-oriented language, it is in many aspects similar to general purpose programming languages such as Java and supports sufficient features to emulate an object-oriented language. It can be used in way of emulating class concept, which allows for defining a class that can encapsulate data variables, methods of initializing data variables, and service methods, which allow other components to access the services of the component.

The presentation code of a component may be used as a basic building part (e.g., subcomponent) of a larger component. Programs may be developed to "capture" and copy the presentation code of the pre-built component into a larger container component as a building subcomponent.

The presentation code of a subcomponent may contain the method, which may be used to call the service method of another subcomponent. Therefore, another kind of program may be designed to get the name of the service method of the subcomponent and use the name to write the cross-calling method in JavaScript language, allowing the subcomponents to communicate with each other.

Moreover, a program can be developed to write additional application code to establish the communication between the container component and the subcomponents.

Since JavaScript functions and variables are global in scope, one character string (e.g., one name identity) cannot be used by two variables or service names on the web page.

The presentation code may be designed to allow graphic images to be placed anywhere on the screen of the client computer. The coordinates of the graphic elements should be designed to accommodate the ability to place the presentation code deeply inside a nested component hierarchy. The presentation code may use a relative coordinates system for graphical elements. Relative coordinates may be converted to the absolute coordinates by traversing up the DOM/XML Tree to calculate the absolute coordinates, if necessary. Since a component's presentation code may be placed deeply in a component hierarchy, care should be taken to avoid bugs in treating the coordinate system.

F. Sample Presentation Code

1. Stock Quote for Company

The presentation code 202 as viewed under an SVG viewer for displaying a stock quote 200 for the company with ticker ORCL is shown in FIG. 2a.

2. Rotate-Banner

The complete presentation code of Rotate-banner is shown in Appendix A. It has a list of four subcomponents for showing stock information (banner) for the companies with tickers ORCL, MSFT, INTC, and SUNW, respectively. Upon being loaded, it displays only the first component for ORCL. It displays the next component in the list when a user clicks on the currently displayed banner. When the user clicks on the last banner, it displays the first banner, for ORCL again. The source code in the figure contains four sections: Section One contains global variables and code to initialize them, and Sections Two to Four contain the presentation code of the Rotate_banner component.

Upon initial loading, only the banner for ORCL is set visible. Upon clicking on the initially displayed banner, the object's listener function display_banner is called, which hides the currently displayed banner and displays the next banner, MSFT (Note that index is from 0 to 3). Upon clicking on the banner again, display_banner( ) is called again, which hides the displayed banner and displays the next banner, which is the banner for INTC. Clicking on this banner will cause it to show the banner for SUNW. At this point, one more click cause display_banner( ) to display the first banner, the banner for ORCL.

In Section One, the code defines a global variable "onload_init_list", which is an array that may be accessed by any presentation code to add its initialization function, which is called when the svg-document loaded. The function svg_doc_onload_init (evt) contains the code to loop through the array and calls all these functions. This function is registered in order to be called upon the loading of the SVG document by statement: onload="svg_doc_onload_init(evt)" in the first line of the svg-code. The first section also defines a global variable "SVG_Document", which may be used to access elements in the SVG-document. The function "init_svg_doc (e)" initializes the global variable "SVG_Document", when the SVG document is loaded. This section is not part of the presentation code, but the code to define global variables. The SVG source also contains body part of the SVG document to enclose the code of the components. The SVG document body is defined by the statement: <svg width='500' height='200' onload='svg_doc_onload_init(evt)'> and </svg>.

Sections Two to Four contain the presentation code of Rotate_banner. Section Two contains the definition of the rotate_banner class. This class supports two service methods. The first method is add_baner (baner_id), which may be used to add subcomponents during the initialization of the object. The second method, display_baner(new_baner), may be called to hide the subcomponent currently displayed and display a new subcomponent, whose index is stored in the parameter variable new_baner. This method locates the group element containing the subcomponent using the "ID" of the group, and manipulates its attributes to hide and display. Section Three contains the code to instantiate a rotate_banner object and the code to initialize it. Upon initialization, four ids are added using the service method of the Rotate_banner object.

Section Four contains SVG-instructions to present the component and its subcomponents. The SVG-instructions define each of four subcomponents as a group and assign a name to each of the group ids (banner_id1_UNQ_IDX, banner_id2_UNQ_IDX, banner_id3_UNQ_IDX, and banner_id4_UNQ_IDX). These ids are used in Section Two to add the group-elements containing the subcomponents. Each group also contains a presentation code of the corresponding subcomponent. The presentation code provides the definitions of graphic images or banners, respectively for ORCL, MSFT, INTC, and SUNW. By selecting style value in the group id line, only the banner for ORCL is set visible while the rest of three banners are not visible. Also, each group sets "onclick" event listener to call the object's service method display_baner( ) to display the next subcomponent in the list, using the statement: onclick="rotate_obj_UNQ_IDX.display_baner(index)". This service method is called when user clicks on the subcomponent.

Although the service methods of the object of Rotate_banner is used within the presentation code, they are global in scope and may be called from any where in the SVG document or by any other component in the SVG document.

3. Show_layer

The code generator for show-layer takes an array of components. It generates the presentation code of the Show_layer component that can display or hide each subcomponent independently. Appendix B shows the actual presentation code of the Show_layer component. It has a list of four subcomponents for showing stock information for the companies with ticker ORCL, MSFT, INTC, and SUNW. Upon being loaded, show-layer displays only the first component ORCL.

The figure also contains four hot squares, which are used to demonstrate the way external code uses the service methods of presentation code to communicate with and control the application component. If the user clicks on any of the square-button on right, it uses the service-method for the presentation code and switches the state of respective component between showing the component (shown) and hiding the component (hidden).

The source code in the figure contains five sections. The first section contains global variables and code to initialize them. The Sections Two to Four contain the presentation code of the Show_layer component.

In Section One, the code defines a global variable "onload_init_list", which is an array that may be accessed by any presentation code to add its initialization function, which is called when the svg-document is loaded. The function svg_doc_onload_init (evt) contains the code to loop through the array and calls all these functions. This function is called upon the loading of the SVG document by statement: onload="svg_doc_onload_init(evt)" in the first line of the svg-code. The first section also defines a global variable "SVG_Document", which may be used to access elements in the SVG-document. The function "init_svg_doc(e)" initializes the global variable "SVG_Document", when the SVG-document is loaded.

Sections Two to Four contain the presentation code of the sample show_layer. Section Two contains the definition of the show_layer class. This class supports four methods. The first method is show_layer(lid, stat), which may be used to set the state for the subcomponent, whose index is 'lid'. The parameter 'stat' may contain 'visible' or 'hidden' to request SHOW or HIDE state respectively. The second method, switch_state (lid) may be called to switch the state (between show and hide) for the subcomponent, whose index given in the parameter 'lid'. The third method is add_callback(cb_name), which may be used to register a callback function, whose reference is passed in the parameter "CB_NAME". This callback function will be called when the state of any subcomponent changes. The fourth method is layer_init(e), which is called to initialize the show_layer object.

Within the class definition, the presentation code may include the component integration data such as the names of service methods and/or variables about the subcomponent in a comment section, which is not used by the SVG viewer. The function of the component integration data will be discussed in the Section of Integrated Component Code Generator (ICCG).

Section Three contains the code to instantiate a show_layer object and the code to initialize it. In the second section, an array of ids is declared and a show_layer object is instantiated, whose constructor takes two arguments: the above ID array and the index of the first subcomponent to be displayed. The initialization code adds the initialization method of the object to the global onload-init list "onload_init_list", which causes the method "layer_init(e)" to be called upon the loading of the SVG-document to initialize the show_layer object.

Section Four contains SVG-instructions to present the component and its subcomponents. The SVG instructions define a group element for each of four subcomponents and assign a name to each of the ids of the group elements (layer_id1_IDX_N, layer_id2_IDX_N, layer_id3_IDX_N, and layer_id4_IDX_N). The constructor of the object, in the Section Three, uses these id names to add the IDs of the group elements to an array and pass the array to the object. Each of the group-elements contains the presentation code of the corresponding subcomponent. The presentation code provides the definitions of graphic images or layers for ORCL, MSFT, INTC, and SUNW.

Section Five contains sample external code, which demonstrates how to use the service methods of the presentation code of the Show_layer. The code defines a function switch_the_state(num), which calls the service method layer_obj_IDX_N.switch_state(num) to switch the state of a layer passed in the parameter 'num'. This section also contains SVG code to display four group-elements, each of which contains the SVG code to present a square and title. Further, each group-element sets "onclick" event listener to call the function switch_the_state(index), where index is set to switch the state of appropriate layers based on the title for the square. This section also contains a function my_test_callback(num, cb_obj, stat), which prints the layer number and the state of the layer, to which the values are passed in the parameters. This function is registered as a callback for the object for the presentation code to use the service method:

layer_obj_IDX_N.add_callback(my_test_callback). This callback function is notified whenever the state of any component is changed. For example, clicking on the square of the first component, ORCL, will cause the service method, switch_the_state(num), to change the state between shown and hidden states. Upon the change of state, my_test_callback(num, cb_obj, stat) is immediately notified to display an alert message. The same is true for components MSFT, INTC, and SUNW.

The presentation code supports a service method to register a callback function. The service method can be called from anywhere in the SVG document. This code shows how JavaScript code and other presentation code use the service method of the presentation code of a component.

4. Service Registration

By designing the presentation-code-generating program, the presentation code of one component may use predefined global objects to establish communication with the presentation code of other component in an application as shown in Appendix C. The application may define certain global objects, which could be accessed by any presentation code. Their names and services are defined in advance so that they can be accessed anywhere in the presentation code. The code in Appendix C shows a method of using a predefined global object to establish communication between subcomponents. It is a publish-and-subscribe method. This code listing also contains a few sample functions to demonstrate this. If the code is loaded into an SVG viewer, it displays a series of popup messages.

The source code in the listing of Appendix C contains four sections. Sections One and Two contain class definitions for the registration object and the code to instantiate the global registration object. Section Three contains sample methods for the presentation code of each of the components to register its service methods in the SVG document. Section Four contains sample methods for the presentation code of other components to access the services.

Section One contains the class definition code of the Service Registration object. This class supports three methods. The first method is add_service(name, func), which may be used to register a service function or object, whose name is given in the parameter 'name'. The parameter 'func' contains the reference to the service method to be called to provide the service. The second method, find_service (ser_str) may be called to get the service method or object, whose name is given in the parameter 'ser_str'. The third method, get_service (ser_str, par1 par2, par3) may be called to run the service method, whose service name is given in the parameter 'ser_str'.

Section Two contains the code to instantiate a service_register_class object. The name of the instantiated object may be predefined for the application and the global object "service_register_obj" can be referred from anywhere in the SVG document. The presentation code of any component in the SVG document could publish its service by registering the service function and give a unique name to the service. Any other component could subscribe the service if it knows the unique name of the service.

Section Three contains code that defines three test service functions. The section also contains code that uses three unique names to register each of the functions with the global "service_register obj". The first function is test service1 (par1, par2, par3), which expects an XML-string in the first parameter and displays two popup message windows. This also shows a sample method to use XML-data variable as a function parameter to pass data between two components. Second and Third functions just display a popup message each. Section Four contains an XML-string and code that defines sample test function services_use_demo(e). The code in the function uses the names or the services to lookup the services.

Example 1

Pie Chart

Figure 3A:
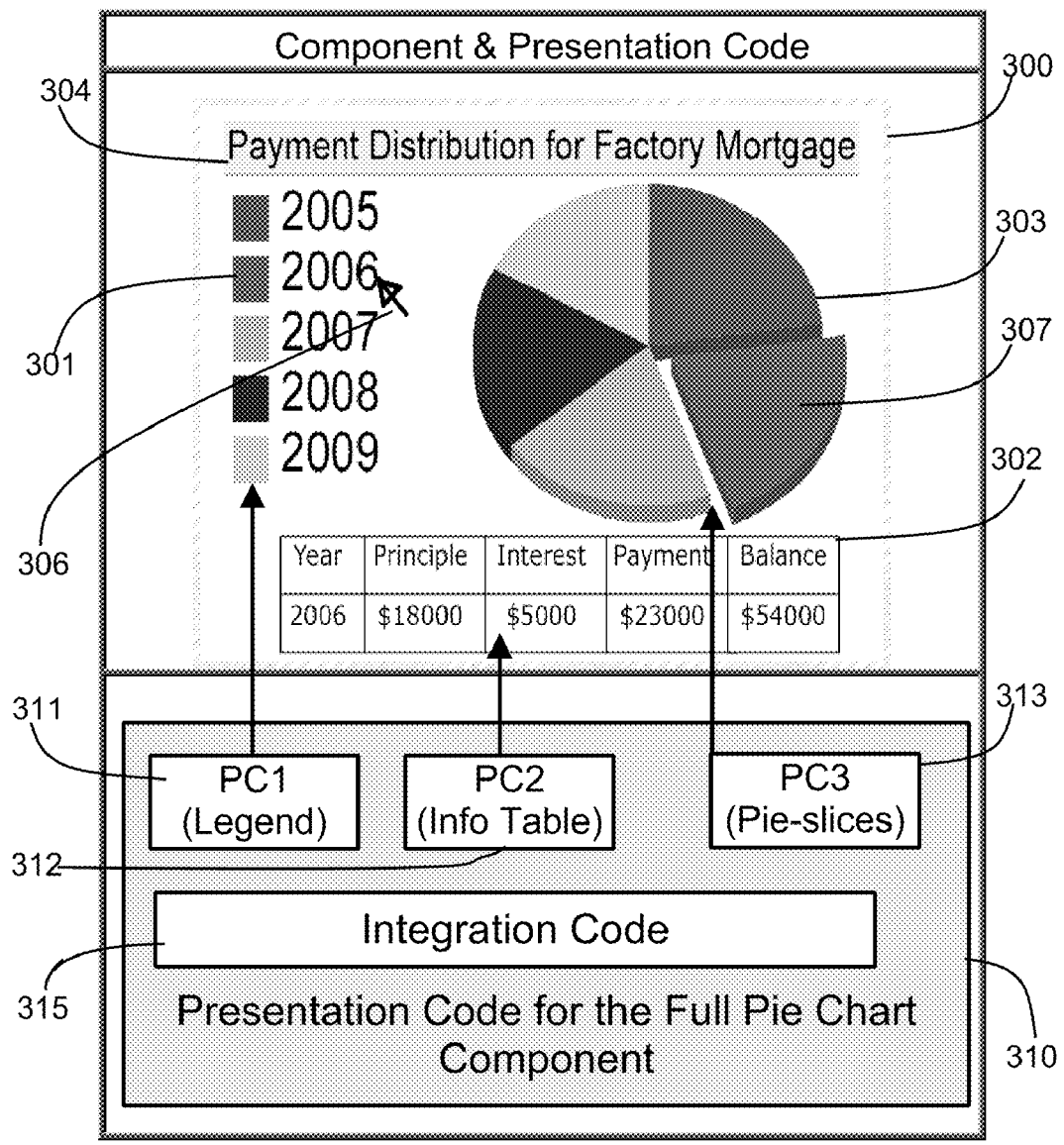
FIG. 3a shows a pie chart with three components: legend, Info-table and chart.

The presentation image of a full pie chart component is shown in FIG. 3a. The full pie chart component 300 contains subcomponents such as legend 301, Info-table 302 and pie slices 303 (for presenting slices of the pie chart). Presentation code sections 311, 312 and 313 respectively present their subcomponents, which are embedded in the presentation code 310 of the full pie chart component 300. The presentation code of the full pie chart contains integration code 315 to integrate subcomponents so that they are able to collaborate with each other. All these subcomponents are integrated and work together. When mouse moves on any of the legend items 306, it highlights the corresponding slice 307 in the pie chart 303 and displays relevant information in the info-table 302.

The presentation code 310 may also contain additional code to perform miscellaneous tasks such as placing the subcomponents. The presentation code comprises the presentation code of the subcomponents such as legend 311, info-table 312 and pie-slices 313. The separate chuck of SVG code, defined by tags <g> and </g>, is dedicated to each of the subcomponents. The location of each of the subcomponents in the component is determined by the group's attribute transform="translate(X Y)". X and Y are coordinates of the group with respect to top left corner of the container group.

While the presentation code demonstrated the above examples are associated with graphic images, it is not so limited. Presentation code (more appropriately, application code) may be used to control hardware devices through interface such as ActiveX supported in the platform. Therefore, presentation code includes any type of code that is proper for the platform.

G. Component Code Generator (CCG)

A component code generator (CCG) is built to create the presentation code of component. The listing in Appendix E shows an example of CCG for rotate banner.

1. Basic Code Structures and Properties

A CCG contains the code necessary for presenting the component (e.g., the presentation logic). Since a component is ordinarily presented on computer screen to reflect some properties observed in the real world, the CCG of the component require some application data. However, it is not required to contain any code of application logic such as retrieving business data, analyzing system performance, and modeling systems.

The basic CCGs implemented in the present invention are derived from the base class AgileTemplate.Java even though the class name is arbitrary. AgileTemplate.java is an abstract Java class for the CCG and one of such sample implementation is shown in Appendix D. This class has a variable UNQ_ID, which is initialized at the time of object instantiation using any utility tool to assign unique ID (a number or string) for this component. An ID assigned to one component must not be used by any other component in the SVG document. This utility tool remembers all of the assigned IDs and provides a new id for each new request. In this simple example, it uses static variable TemplateCount to assign a unique number to UNQ_ID. This UNQ_ID is appended to the names of variable and SVG element IDs of the presentation code in order to avoid conflicts in the names of the service methods and variables in the SVG document. It also implements an abstract method CGM. Optionally, the CCGs may be implemented in their own classes even though this implementation might require specific attention from application developers who use the CCGs.

A CCG, which implements its own presentation logic, comprises variables for storing data, one or more constructors, and methods for initializing the data. The CCG implements simple and intuitive methods for supplying data and, optionally, specifying presentation style such as drawing colors, font sizes, and other customization information. The CCG also takes the parameters of the requesting browser as inputs. It uses all the data to create presentation code in SVG and JavaScript language.

The CCG supports code-generating method (CGM), which is a service method of its instantiated object. When this method is called, it generates a chunk of SVG or equivalent code, referred to as presentation code, which is compatible with the requesting platform. CGM is an abstract method in the super class, AgileTemplate, and is supported by all CCGs used in this invention. CGM is implemented in all derived classes and supported in all class objects derived from the super class. Since CGM is defined in the super class, each derived subclass inherits the CGM from the supper class and overrides it by the CGM of the subclass. By way of example, the CGM in a pie chart subclass generates presentation code to show a pie chart while the CGM in a line chart subclass generates the presentation code to display a line chart.

A container CCG may contain class variables to store all the information necessary to initialize the CCGs of the subcomponents. It provides constructors and methods to initialize its object variables. The container CCG validates and uses the data in the variables to initialize each of the CCG objects of subcomponents. It initializes the variables of each CCG object before it calls CGM of the CCG object.

A container CCG may get CCG objects of subcomponents by any importing method provided in the programming language. When CCGs of subcomponents can be directly imported into a container CCG using suitable method, the subcomponents are replaceable. When the container CCG and the CCG of subcomponent are coded in Java, CCG objects may be input to the container CCG class using its set-methods (e.g., constructors or initialization methods). In this case, the CCG objects are initialized outside the container CCG code. The container CCG may call the CGM of the CCG objects of subcomponents to generate the presentation code of the subcomponents.

To present a component such as a pie chart or a map in the platform using an instantiated CCG class object, it is necessary to provide the minimum amount of data to initialize the object. If CCG is coded in Java, data initiation may be done using set methods. Additional methods may be used in the CCG class to customize the component. The CCG object may accept a wide range of data concerning presentation style, customization or user's profile, business data, the requesting browser, and even other CCG objects, which can be used as building blocks or subcomponents.

Example 2

Pseudo Code of Using CGM of the CCG

The basic steps of generating presentation code are shown by following pseudo code:

10. PresTempPie Pie1=new PresTempPie("Portfolio at the end of 2 dn Quarter");

20. Double val[ ]={10000, 12000, 14000, 16000, 18000};

30. String names [ ]={"Sun", "Microsoft", "IBM", "Intel", "Oracle"};
40. Pie1.setData(5, val, names);
50. Pie1.CGM(pageinfo, out);

First, a Java class, PresTempPie, is defined. In line 10, a class object is instantiated with a title "Portfolio at the end of 2 dn Quarter". The object saves this title in the string variable and uses it to create presentation code. In line 20, an array of doubles is assigned with five performance numbers, one for each company. In line 30, five name strings are assigned using respective company names. The value assigned to the double of a given index number of val☐ correspond to the company name in names☐ with the same index. In line 40, Pie1.setData is called to set data for the object Pie1 in run time. In line 50, CGM is called to generate the presentation code in the SVG format. By using the CCG to generate presentation code of the pie, it is unnecessary to write presentation code for the pie line by line.

When output stream 'OUT' is used in Java to create presentation code, anything to be written by the "OUT" statement is appended to the document currently under creation. If this component is used as a subcomponent of a larger component, the code of this component is embedded at a proper location in the SVG code of the larger component.

Generally, one CCG class is needed for each type of components: one for the pie chart component, one for the hierarchical menu component, and one for the expandable menu component.

The objective of designing CCGs is that the CGM is able to generate intended presentation code dynamically using run-time data. It is desirable that the CCG is highly configurable.

H. Business Logic in Component-Code Generator

A CCG may contain code of business logic. When a CCG contains code of business logic in the container component itself or the CCG code of the subcomponents, it is referred to as Application Component Code Generator (ACCG). An ACCG can be designed to perform or support specific application functions or to independently create an application component.

1. Basic Properties of ACCG

Figure 4:
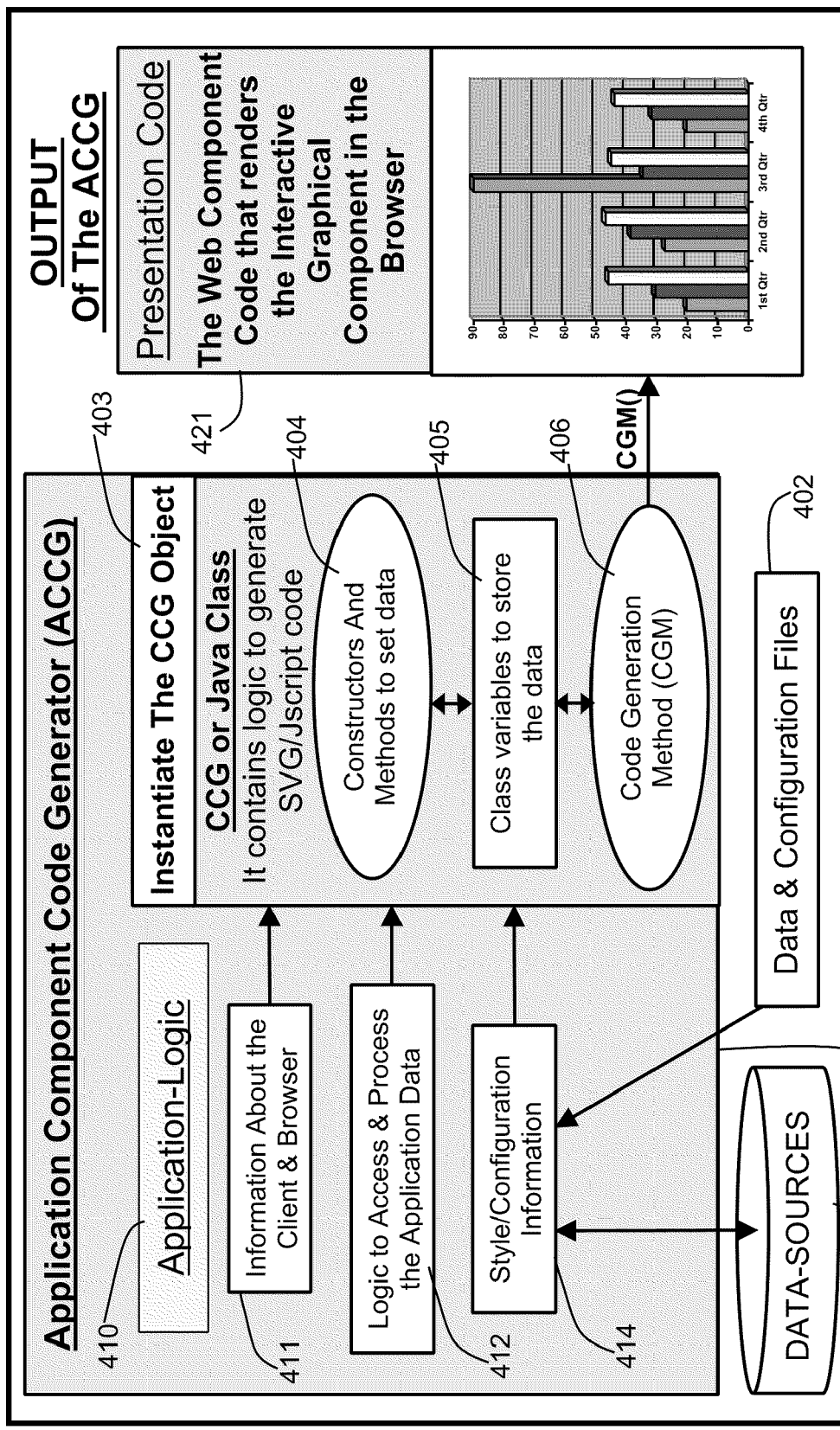
FIG. 4 shows the class definition and data structure of a sample ACCG.

An ACCG is a special type of Java class and contains all the characteristics of CCG (FIG. 4). This figure shows internal structure of an ACCG 400, which uses a CCG 403 to generate code for presenting a chart 421. The ACCG also contains application logic 410, logic to access and process application data 412, and information about client and browser 411. The CCG 403 contains constructors and set method 404 and class variables 405. It also supports CGM 406 so that its instantiated class objects are freely interchangeable with CCG objects. Therefore, an ACCG that is derived from the super class for a CCG also supports the same CGM used in the CCG. Both ACCG and CCG objects may be used as building blocks in the same way to generate the presentation code of subcomponents.

Figure 5:
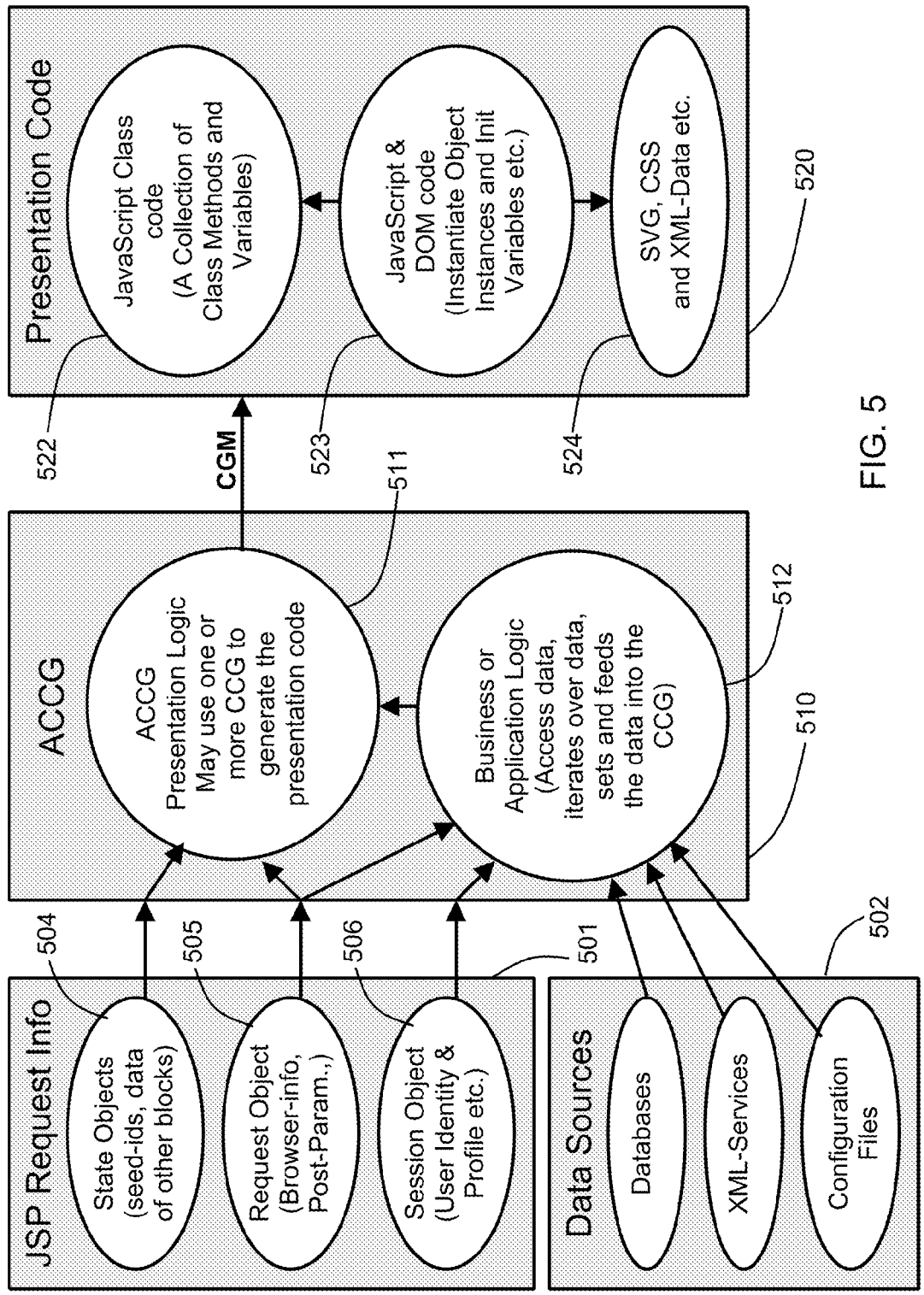
FIG. 5 shows the method of encapsulating the data on business logic in an ACCG.

In a CCG, the code of presentation logic is encapsulated in the object class (FIG. 5). While it is not required to implement an ACCG 510 in an object class, it is preferable to use class definition to encapsulate both the code of presentation logic 511 and the code of business logic 512. As shown in FIG. 5, client computer and browser information 505, application data 502, computation methods for application data, style and configuration data, user's profile and preference information 506 can be placed in variables and methods independent of the portion of code to present the component. Once a class object is instantiated, the values of the variables, which are used in presenting the component, can be set in run time. The code of application logic can be designed to access internal and external data (e.g., databases and other data sources for the application), initialize the variables, and get information about the platform such as the version and type of the requesting browser. Also, the methods used in application logic may be called to process application data for customization before they are used to generate the presentation code. By calling its CGM, the ACCG object generates platform-compatible presentation code 520 of the component in real time. It is desirable to design the ACCG so that it is independent of the code of presentation logic and requires the minimal or no initialization by fully encapsulating both application logic code and presentation logic code necessary to build the component.

Figure 6:
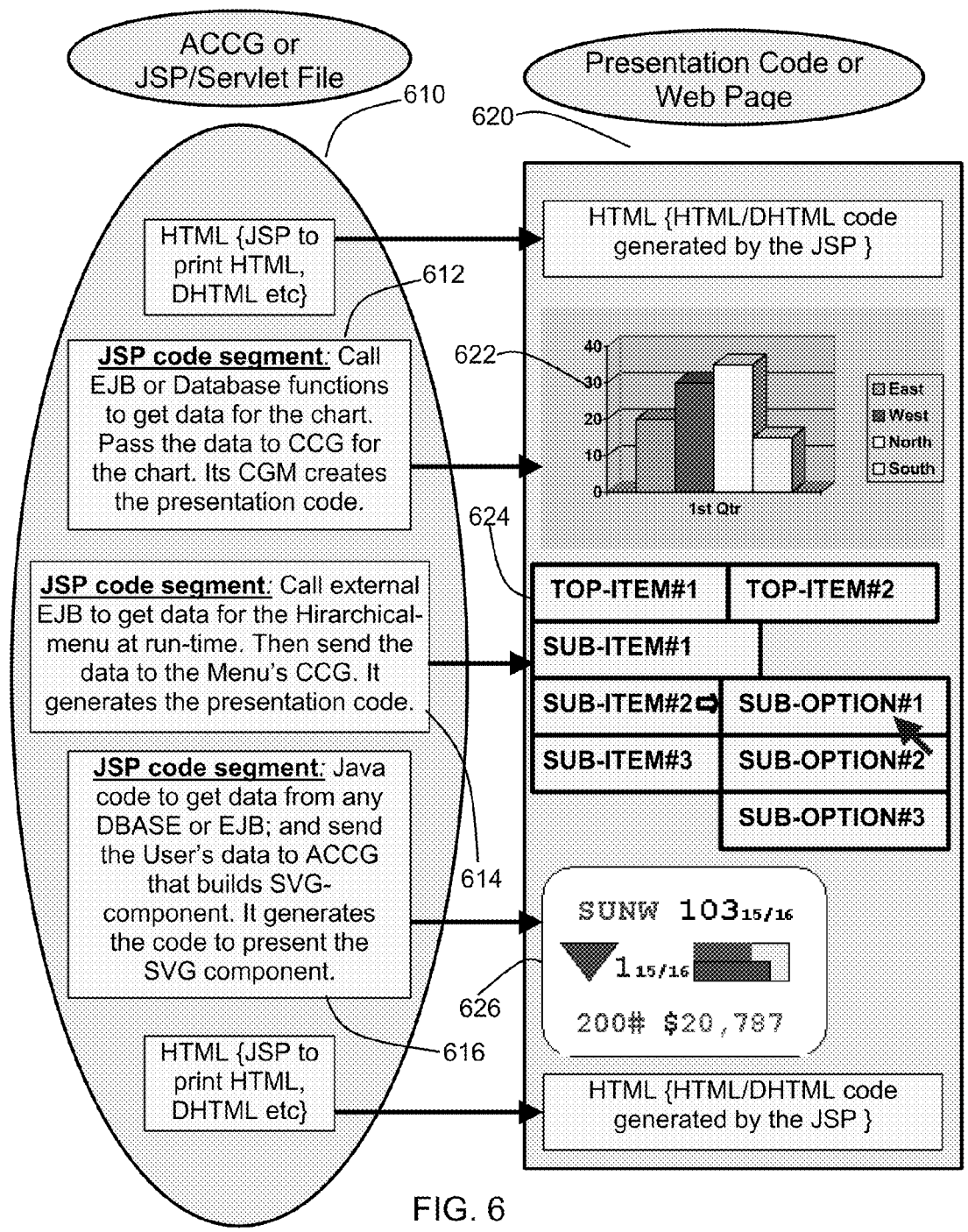
FIG. 6 shows the process of building presentation code by an ACCG using four subcomponents.

Instead of containing its own presentation-logic code, an ACCG may use the objects of the basic CCGs such as pie chart, trees and table to generate presentation code for the subcomponents. In this case, the ACCG contains code to instantiate and initialize subcomponent CCG objects and code to call the CGM of the objects to generate the presentation code of the subcomponents. FIG. 3*c* shows a component created by an ACCG using expandable menu and stock quote. FIG. 6 shows how an ACCG uses three components to build a container component.

Because an ACCG is a special member of CCGs and has the basic functions of CCGs, the class objects of subcomponent ACCGs may be used by a container ACCG to generate the presentation code of the subcomponents. By repeating this process, application developers can build larger and larger components.

Figure 7:
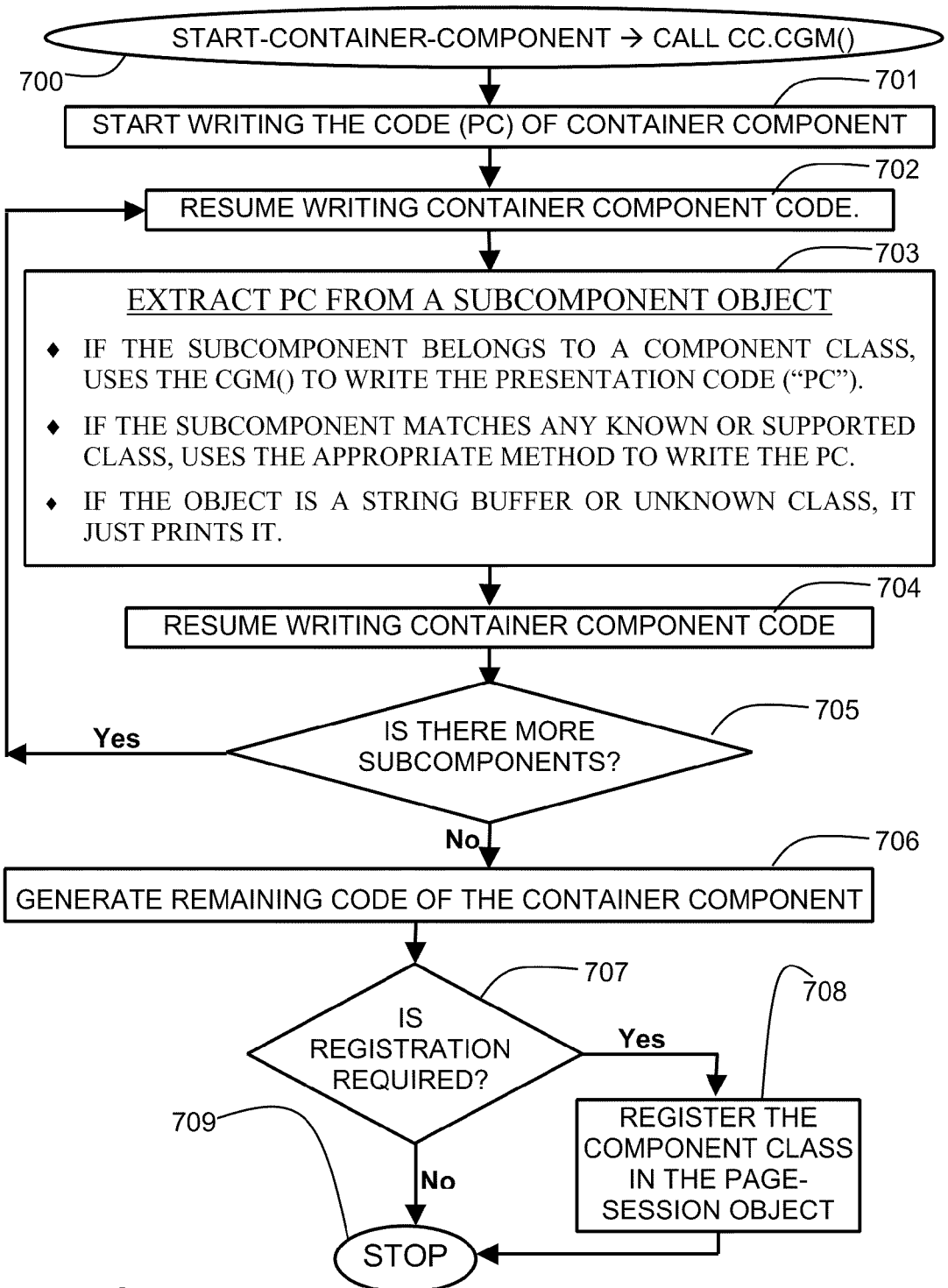
FIG. 7 shows the process used by the CGM of an ACCG to generate presentation code without code of integration logic.

The ACCG not only generates the presentation code of the container component but also generates the rest of the presentation code such as placing/organizing the subcomponents generated by enclosed CGMs and fills in any gaps (FIG. 7).

In many cases, black-box assembling technique is not sufficient. In the pie chart 300 (in FIG. 3*a*), for instance, the Info-table 302 component displays a few pieces of information when mouse 306 is moved onto certain hotspots. Also, it is desirable to highlight the relevant parts 307 of the chart when the mouse is moved on top of an item in the legend 301. To support those functionalities, subcomponents in the presentation code needs to talk to each other. The container CCG for creating such application code needs to generate several lines of special application code 315 necessary for the inter-component communication, as discussed in next section.

Two CCGs are provided in Example 7 in Subsection 4, Section I. The source code of the two CCGs that use above CCGs as subcomponents is shown in Appendices E and F.

Example 3

Pseudo Code of Stock Quote Component

The following is an example of an ACCG that generates presentation code to present the stock information (FIG. 2*b*). The ACCG in this example is a Java-class component that takes a company ticker symbol as input and generates presentation code to present the stock information as shown in the figure.

The ACCG of the stock component has method or constructor to set a ticker symbol. The application developer may implement application logic in the class definition. The CGM uses the ticker symbol to access other data sources for the real-time stock information of the company associated with the ticker, and then generates the presentation code. To generate the component's presentation code, it may use CCGs of table and charts to present its subcomponents.

A stock object is instantiated with the ticker symbol of the company as below:

StockInfoPCF SiACCG1=new StockInfoPCF("SUNW");

An application developer may instantiate stock objects for tickers ORCL and MSFT, respectively.

StockInfoPCF SiPCF2=new StockInfoPCF("ORCL");
    StockInfoPCF SiPCF3=new StockInfoPCF("MSFT");

These ACCG objects may be passed to other ACCG or CCGs as building blocks. The ACCG objects, upon being called by the container ACCGs, generate the presentation code to present the stock information, respectively, for those companies.

It is possible to build many ACCG classes, which take the ticker symbols and build the charts for one-year, six-month and three-month periods for the companies using customer preference data. The container ACCG can dynamically use if-then-else statements to instantiate ACCG objects to build presentation code respectively for one-year, six-month, and three-month periods.

AgileTempate Subchart=null;
    If (user_prefers==yearly_chart)
    Subchart=StockYearlyChart("ORCL");
    Else
    If (user_prefers==half_yearly)
    Subchart=new StockHalfYearlyChart("ORCL");
    Else
    Subchart=new StockQuarterlyChart("ORCL");
    Subchart.CGM( );

The above pseudo code shows a method of dynamically selecting subcomponents and building custom container component. The ACCGs of those sub-charts may contain methods for accessing the data about user preferences and the parameters of the requesting device. The instantiated objects of the ACCG may use the data and the parameters to customize the style of the chart. The container ACCGs may dynamically select their subcomponents and integrate the presentation code generated by the subcomponent.

It is often desirable to create presentation code of many subcomponents (e.g., stock quotes in FIG. 2b) using real-time data. The presentation code may also contain other types of subcomponents, and each of the subcomponents in turn can be custom-built on the basis of user's profile and preferences. The container ACCG supports a method for inputting an array of strings holding the names of companies and an array of CCG objects. The container ACCG also has a rich set of methods for configuring the presentation style and looks.

2. Black Box Assembling of Subcomponents in ACCG

A container CCG is the CCG of the component to be built. It may be designed to use the CCG objects of any suitable subcomponents such as line chart, trees and table to generate the presentation code for them.

(a) The Basic Features and Functions of Container CCGs

The container CCG is designed to perform the following functions:

(i) instantiating and initializing the CCG objects of subcomponents or providing a method for inputting the CCG objects of subcomponents, (ii) calling the CGMs of the objects to generate the presentation code of the subcomponents in the right location in the resultant presentation code, and (iii) generating miscellaneous code necessary for the container component.

As shown in Appendices A and B, the presentation code of the container component basically comprises SVG code, JavaScript code and the presentation code of subcomponents. It can contain code in any of other programming languages which is proper in the rendering platform.

The container CCG is designed so that when an instantiated objects of the container is run, the CGM of the container CCG is able to generate for the container component functional presentation code, including SVG code, JavaScript, and subcomponent presentation code. The complete application code is to be coded in the container CGM. If the container CCG is coded in Java language, the developer simply uses the OUT statement using quoted strings to be placed in the container CGM. If the CCG is coded in other languages such as C (which can be used to implement OOP, indirectly) and C++, the developer simply uses PRINTF or COUT statements in the container CGM. Regardless of the language used in coding the container CCG, the developer knows in advance what application code statements the developer wants to appear in the application code. Therefore, the developer can use a series of string-printing statements to code the wanted application code statements in the container CGM. When the container CCG is run, it generates the intended code statements. This simple technique can be used to generate SVG code, JavaScript code, and other miscellaneous code necessary for the container component.

Since the container CCG gets the presentation code of subcomponents by calling the CGMs of the subcomponent CCG objects, the developer has no need to code for the presentation code of subcomponents in the container CGM line by line. What the developer needs to consider is where to place the presentation code of the subcomponents and where to place the subcomponents on the display screen. The coordinate system for components varies, depending upon the programming language and technologies.

When application code is written in SVG, the location of a subcomponent's presentation code in the container component's code is independent of the location or coordinates of the subcomponent on the screen and its shape. The subcomponent location is defined by the X and Y values in transform='translate (X Y)' with respect to the coordinates of the enclosing element/component location. Therefore, plural subcomponents may be placed in the presentation code of the container component in any order. To define the location of the component in the display screen, the container CCG uses the following statement:

out.println("<g transform='translate(X Y)'>");
    SubCCG.CGM(out, pageinfo);
    out.printin("</g>");

One exception to the above rule is when two subcomponents overlap on the display screen (e.g., one is on top of the other), the presentation code of the top subcomponent must be placed after the presentation code of the bottom subcomponent in the application code.

In comparison, if the presentation code of subcomponents is written in HTML, the locations of the subcomponents are determined by the order the subcomponents appear. If a subcomponent is in a table cell, the call to CGM of the subcomponent is made between two tags that define the cell:

out.println("<TABLE WIDTH=100%>");
    out.println("<TR>"); out.println("<TD>");
    SubCCG.CGM(out, pageinfo);
    out.printin("</TD>"); out.printIn("</TR>"
    out.println("</TABLE>");

If a SVG document is included in an HTML document, the SVG document must be placed in a separate file and may be included in the HTML page using the EMBED tag. Many XML based graphics technologies may not allow for including documents from other XML based graphics technologies. Therefore, it is necessary to consult technical manuals of respective graphic technologies to determine whether two particular technologies can be used in combination.

The AgileTemplate may support commonly useful methods and properties such as coordinates for presenting the component and defining the (X, Y) size of the bounding box. If those methods and properties are supported in the abstract class, they may also be accessed from CCG objects.

After a container CCG is properly built for a component using this black-box assembling technique, an object of the container CCG can be used as a subcomponent by another larger container CCG. In building this larger container component, the developer may use the same approach in coding its CCG, subject to the same limitation discussed below. Since the CGM of the original container CCG is able to generate complete presentation code of the original container. The presentation code of the original container component, which is now a subcomponent in the large container component, naturally includes SVG code, JavaScript code, and subcomponent's presentation code.

FIG. 7 shows the general steps for generating a simple container component code when its CGM is run. When the CGM is started, it first starts writing presentation code at step 701 of the component. It then writes the presentation code of the first subcomponent at step 703 by calling the CGM of the subcomponent if the object is a subcomponent belonging to a component class. If the object is unknown class or a string buffer, the CGM just prints it out. The CGM writes container component code at step 704 and checks if there are more objects at step 705. If there are more, the CGM repeats the process of writing for the objects (at steps 705 and 702). When no more objects are to be written, the CGM generates the remaining code. It may optionally register the component class with a registration object at step 708.

(b) The Limitation on the Use of Black-Box Assembling Method

Black box assembling technique is useful only in the case where the subcomponents in application code do not need to communicate with each other and the container CCG does not need to know the names of service methods and the names of variables used by the subcomponents. In the case, any CCG object can be passed to the container ACCG/CCG as a building block as long as the CCG is proper component from the business point of view. The container component uses only the properties and methods supported in the base class AgileTemplate. Since all the CCG objects are derived from AgileTemplate class, which supports CGM, the container CCG may properly call the CGM of the CCG objects to generate presentation code.

3. Container CCGs Often Used in Black-Box Assembling

The following CCGs may be used to build component using the black-box assembling technique:

(a) Rotate-banner container CCG (its source code in Appendix A). This component takes a list of CCG objects by input and displays one component at a time and displays next component in the list when a user clicks on its hotspot.

(b) TAB CCG. It takes a list of CCG objects and a list of names of the objects, displays the first component and all the names at the top of the display area, and, upon being clicked on a new name, displays its component and highlights the name;

(c) Zoom-and-pan CCG. It takes any CCG object and displays it in a zooming and panning area, and also provides controls to zoom and pan the component.

(d) Drawing-area CCG. It takes a list of CCG objects and each of their coordinates, and draws them at proper locations, and could take a CCG object to use as the background.

(e) Scroll-bars CCG takes a large CCG object and displays it in an area with scroll bars for displaying a larger image in a smaller area.

4. Container CCGs that can use Subcomponent CCG Objects

The following container CCGs may use any subcomponent by using the black-box assembling technique:

(a) The tool-tip. The CCG of tool tip may take any CCG objects instead of just a string. It displays the component generated by the CCG object when mouse moves onto any hotspot. This component could be just a string or a large component, which in turn contains many subcomponents of its own. Since any CCG object may be used in the popup, it gives great freedom to customize the tool-tip. For example, the footer or title of the charts can be presented using CCG objects. In that case, the method that configures this part can accept a CCG object or a string.

(b) Legend CCG. It can take a list of CCG objects and each legend item can be created using a CCG object.

(c). Common menu CCG. The CCG for creating common menu such as hierarchical menus, pull-down menus or popup menus can use any CCG objects in any of the cells of the menus. It gives great freedom to customize the cells.

(d) A map CCG. It may take two CCG objects. It displays a component, which is created by a first CCG object. When a user clicks on a hotspot of the first component, it pops up another component, which is created by a second CCG object. This CCG may be used to present the image of a city map with interest landmarks as hotspots and a popup window for showing detailed information about a selected landmark.

3. Application of ACCGs.

ACCGs were designed in this invention to create the following components.

(a). Custom Weather Chart

An application developer may create a custom weather ACCG, which takes a city name denoted by a zip code and generates presentation code to show the weather conditions for the selected zip code. The ACCG class may have a method or constructor to set the zip code. It may also have a method in the application logic for retrieving the data on the weather conditions for any selected zip code. When a class object is instantiated using an entered zip code, the method for retrieving the data is called to get the data for the weather conditions before the data is used by CGM in generating the presentation code. When a user inputs a zip code, the ACCG object then retrieves the data on the weather conditions for the selected zip code. After the data is set, the ACCG object then generates the presentation code to display the weather conditions. This object may be used as a building block in other ACCGs or CCGs to build a further larger application.

(b). Mouse-Over Menu

Figure 3B:
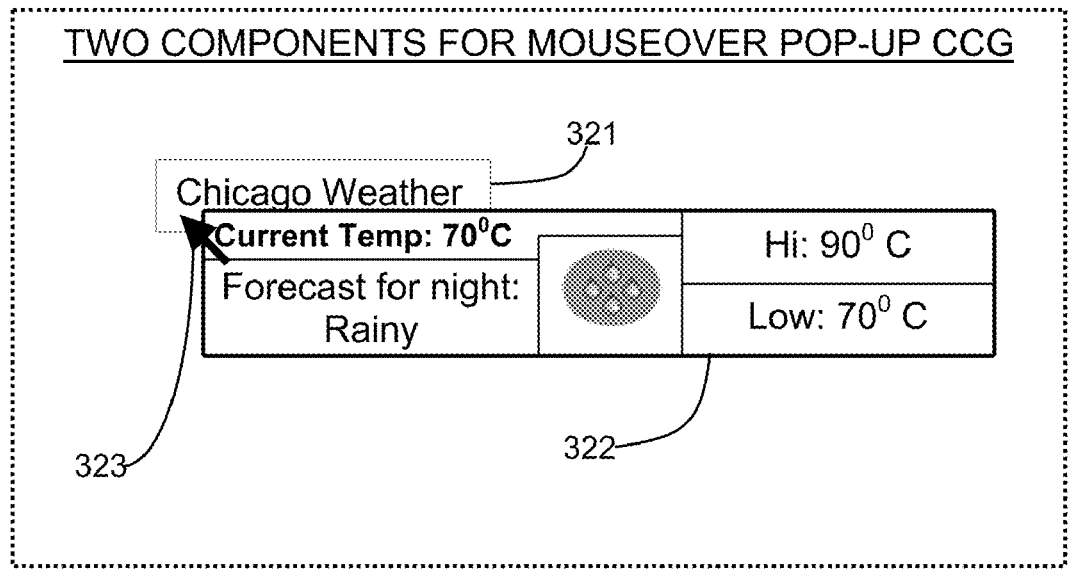
FIG. 3b shows a mouse-over pop-up component.
Figure 3C:
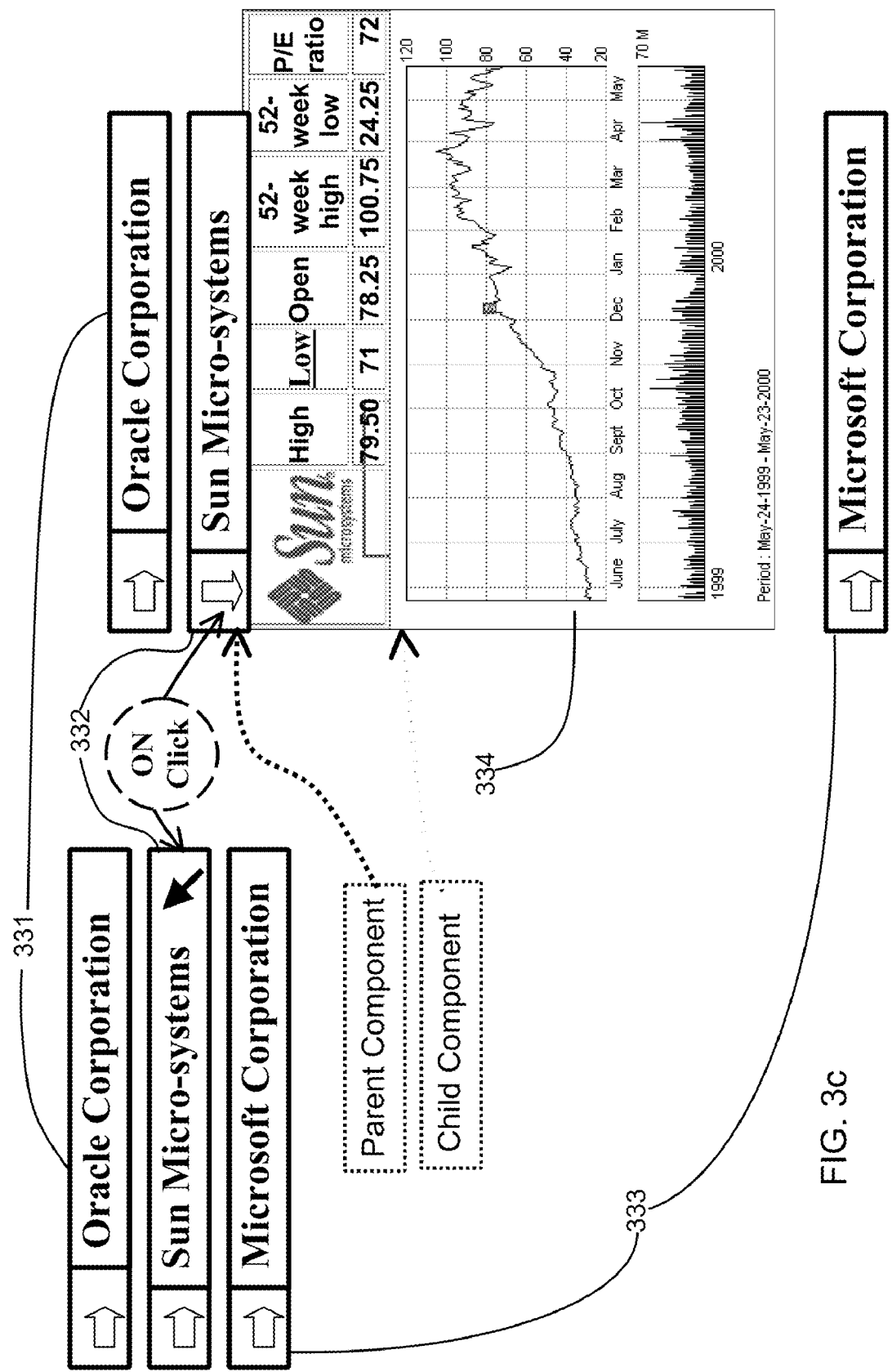
FIG. 3c shows a component using an expandable menu and a chart for stock quote.
Figure 3D:
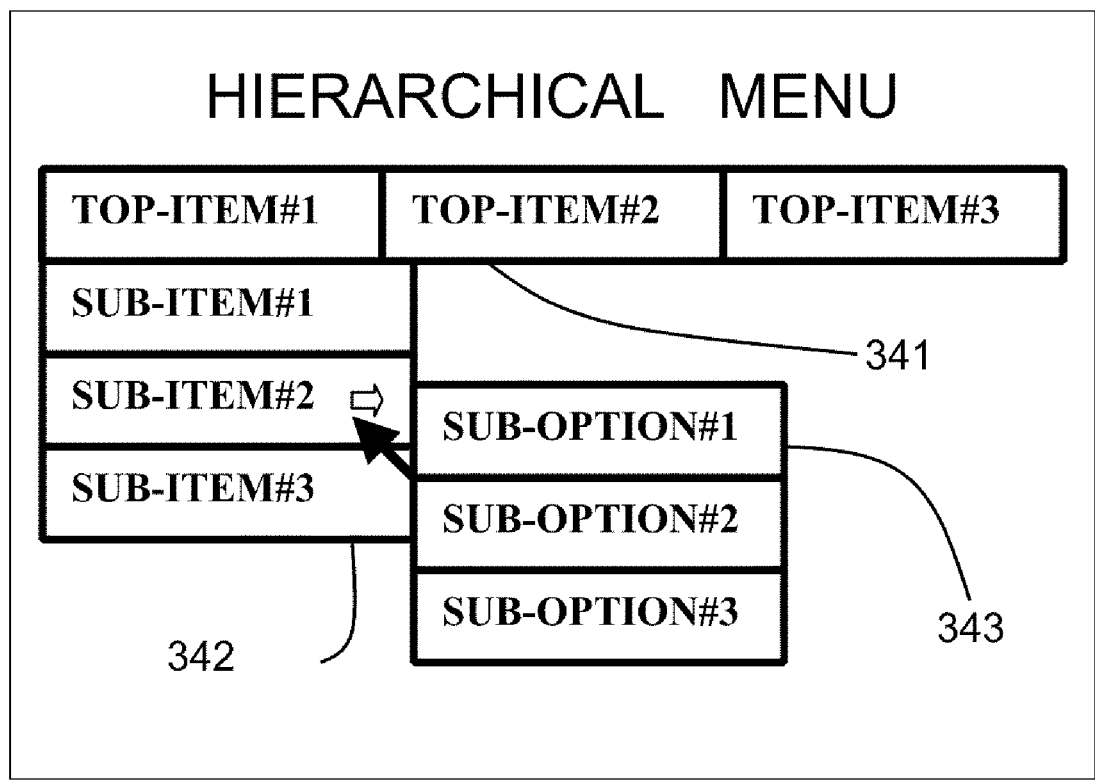
FIG. 3d shows a hierarchical menu component.

The mouse-over popup is shown in FIG. 3*b*. This popup menu uses 2 components. It presents the first component showing "Chicago Weather". When mouse 323 is moved over this component 321, it opens a popup window 322, which shows the second component. The popup window 322, which is another layer, will be closed when the mouse 323 is moved away from both of the components. Each component passed to the mouse-over popup object may be just a string variable or a CCG object. If it is a CCG object, the popup object uses the CGM of the CCG object to generate the presentation code to present the component.

(c). Expandable Menu

An expandable menu component is shown in FIG. 3*c*. Expandable component may have one or more pairs of parent and child components. When a user clicks on the parent component 332 (in the left of FIG. 3*c*), the child component 334 is displayed on the right side of the original position. The parent menu items 333 are moved away from each other to accommodate the extra space required for displaying the "larger" image of the child component. If the child is already displayed, clicking on the parent will cause it removed. Both the child and the parent components may be just string variables or any CCG object. If it is a CCG object, it uses its CGM to generate the presentation code. The CCG uses all subcomponents' presentation code as building blocks to build its presentation code. It is an example of HTML/DHMTL component.

(d). Hierarchical Menu

A hierarchical menu (FIG. 3d) may have many top menu items. Each top menu item 341 may have many submenu items. The menu presentation code contains logic to present the associated sub-menu. When mouse is moved on a top menu item, a pop-up displays submenu items. These sub-menu items 342 may have sub-options 343 and so on. This kind of hierarchy may go to many levels. When the mouse is moved on any of the menu items that have sub-menu items, a pop-up menu displays the sub-menu items. To present a hierarchical menu, a user may instantiate the CCG class for the hierarchical menu. The top menu items and sub-menu items can be specified and passed using simple and intuitive methods of the hierarchical menu class. It is an example of HTML/DHTML component.

5. Wrapper Component Code Generator (CCG)

A wrapper CCG is a special CCG. A wrapper CCG may be created to fetch the presentation code of components or other data from a wide range of sources.

When an ACCG of a component (e.g., stock quote) is running on a remote server at a different location, the wrapper CCG may be used to get presentation code of component from the remote server. The wrapper CCG, which takes a URL and post-parameters as input, call the server to execute the ACCG, whose CGM generates the presentation code of the component and the server return the presentation code. The process is same as a browser fetching a web page from the server. By designing the code of the wrapper CCG, the CGM of the wrapper CCG gets the presentation code of the component and "copy" it in a container component. If the wrapper CCG is used as a subcomponent to generate the presentation code of the remote component (e.g., stock quote), it can generate the presentation code of the remote component.

If the presentation code has been already created and stored in a file, a wrapper CCG, implemented in another class, may be used to extract the presentation code from the file. The input to the object of the wrapper class is the file name. It may also update the names of the variables and service methods in the presentation code by affixing unique index numbers (or unique strings) so that they are not in conflict with the names of the variables of other components in the SVG document.

A wrapper CCG, implemented in class, is reusable. A variety of reusable CCGs may be created to fetch components from many popular applications and files of different formats. By way of example, a wrapper CCG may be used to fetch a small summary data table of a large spreadsheet document and generates SVG code to present the table on a web page. The inputs to the wrapper CCG object may be the filename of the spreadsheet and parameters for locating the summary table. The wrapper CCG can instantly get updated summary data table after is it changed in the remote server.

6. Avoiding Conflicts in Variables and Method Names in Application Code

A large SVG document created using a container CCG for a component may contain the presentation code of many subcomponents. The presentation code of each of the subcomponents may further contain the presentation code of subcomponents. The presentation code of component and/or subcomponents may contain several JavaScript methods and variables. Furthermore, some SVG (or HTML) elements have IDs, which are used to access and manipulate their attributes such as values, color and size. Most of the methods and variables are global in scope. Hence, any variable may be accessed anywhere in the document.

If two subcomponents contain same variable or method names in their presentation code, the presentation code has name conflicts, which may cause a variety of performance problems. To avoid name conflicts, each CCG may use a common utility object for generating a unique seed ID and affixes it to the names of methods and variables of the CCG. Therefore, all global variables and service methods in the presentation code have unique names.

Since the variables or objects in the SVG document are global, all the presentation code can have access to the variables and use the services of the objects. The following shows a technique to track onload Init-Handlers for the presentation code of plural subcomponents.

Web browsers or SVG viewers support the 'onload' event trigger, which calls a method, when it finishes loading the document, as follows:

<svg xmins="http://www.w3.org/svg" onload="onload_init_method(evt)">

Unfortunately, only one method may be called for an SVG document. When the presentation code of several subcomponents are dynamically created in run time, the presentation code of plural subcomponents need to be notified on 'onload' event so that they are initialized. To overcome this limitation, a globally reserved name onload_init_list is used.

var *onload*_init_list=new Array( );

For any component that is to be notified on the 'onload' event, a notification function is to be added to the array by using the following statement.

onload_init_list [onload_init_list.length]=init_pb_onload

The statement can be placed in any location of the SVG document. Each component in the SVG document, which needs to be notified on the onload event, may have this statement in its presentation code. This array grows whenever a new function is added as this statement is encountered while the SVG document is being loaded. When the loading of document is finished, the global method onload_init_method (evt) is executed. It executes all the notification methods by looping through the list of:

function onload_init_method (evt) {
for (var i=0; i<onload_init_list.length; i++)
(onload_init_list[i])(evt);
}

I. Integration Logic in Components Code Generators

A container CCG may contain special code (known as code of integration logic) for generating several lines of application code that establish communication between the container and any subcomponent or communication between any two subcomponents. This type of container CCG is referred to as Integrated Component Code Generator (ICCG).

Like in container ACCG, the CGM of the CCGs of subcomponents generates the presentation code of the subcomponent. In comparison, the code of integration logic is responsible for generating integration code necessary for inter-component communication.

1. The Purpose of Integration Code Generated by Integration Logic

In a model where a container CCG uses subcomponents A and B to build component C, the container CCG has its own method CM, subcomponent A has a method AM, and subcomponent B has a method BM, the code of integration logic may designed to generate the integration code to support the following basic actions ("model actions"):

(a) User's action on the container component C leads to the running of the method AM of subcomponent A;

(b) User's action on subcomponent A leads to the running of the method CM of container component C;

(c) User's action on subcomponent A leads to the running of the method BM of subcomponent B;

(d) data exchange between container component C and subcomponent A; and (e) data exchange between subcomponent A and subcomponent B.

A user's action on a component for those relevant model actions means anything, which directly or indirectly affects the component. It includes user's clicking on a hotspot having a listener function, state change in the component, timer event, and data arrived affecting the component.

The code of integration logic is not required to generate all code necessary for performing all those basic actions. However, whenever integration logic is implemented to generate integration code to support a given model action, it needs to produce all code necessary to support the action. If it is necessary to pass application data in performing a given action, the code of integration logic is required to produce the portion of integration code, which allows for the passing of application data.

2. The Functions of Integration Logic

The code of integration logic means the code to be run in the server for generating integration code that is required to support any or all of the model actions in the client computer. When the code of integration logic is executed in a server, it performs the functions of (1) obtaining the one or more names of the service methods in the presentation code generated by the CCG objects of the subcomponents, and/or choosing names for callback functions and event handlers, and providing the names to the CCG objects of the subcomponents by using a set-method so the CCG objects may incorporate the provided names in the presentation code of the subcomponents, (2) writing declaration statements of callback functions, (3) writing the bodies of callback functions in a language proper in the rendering platform, (4) writing code statements in the application code, allowing the registering of callback functions in the presentation code, and (5) creating necessary variables and/or XML string used by container and subcomponents to exchange data.

Integration code generated by code of integration logic normally contains (1) necessary declaration statements of callback functions, (2) the bodies of callback functions, (3) registration of callback functions for triggering the running the callback functions, and (4) new variables such as common variables, XML strings, or hidden variables used by the container component/subcomponents in exchanging data which is necessary to support the basic actions.

Integration code may include any and all of those code elements necessary to support any one of the basic model actions. However, it is not required that integration code contains all the above four types of code statements. For example, the need for using new variables and parameters depends on the nature of the subcomponent, the details implementation of the ICCG, and the model actions used in the ICCG.

3. Accessing the CCG for Names of Service Methods of Subcomponents

In some cases, the ICCG needs to know the names of service methods of subcomponents and necessary data used by the service method in creating integration code. Methods used in the preferred embodiments of the present invention includes the steps of (a) calling a class method of the CCG objects to get the names of service methods which are used in the presentation code of the subcomponents, (b) calling a method of the abstract class of the CCG objects of subcomponents to get the names of service methods which are used in the presentation code of the subcomponents, (c) setting or getting the names of callback functions using the set method, (d) using registration class for tracking the names of service methods and necessary integration data, and (e) communicating with external components.

(a) Using a Class Method for Returning the Names of Service Methods

Since the CCGs of the subcomponents are implemented in class, the class may be designed to contain service methods, which return the names of the service methods in the presentation code of the subcomponents. The ICCG may get the names of service methods of the subcomponents indirectly. The CCG object may provide (or return) a XML string which contains the names of service methods, a name of a variable in the container component code where the names of service methods may be stored, an object which is able to return the names of service methods, and an address of an object which is able to return the names of the service methods of subcomponents. The ICCG get the names of the service methods used in the presentation code of the subcomponents. If the ICCG is developed in other OOP language, the implementation for getting the names of service methods must be proper in the language.

(b) Using a Service Method for Returning the Name of Service Method in the Abstract Class.

If ICCG needs to integrate imported CCG objects of subcomponents, each of the CCG objects may belong to the abstract class. When a method for returning the name of service method is defined in the abstract class, all the derived class objects of subcomponents have implementation of the method for returning the names of service methods. Therefore, the container CCG can interact with the CCG objects of the imported subcomponents using the abstract class methods to get or set names of the service methods in the presentation code of the subcomponent. Likewise, the ICCG may get the names directly or indirectly from the CCG objects.

(c) Setting or Getting the Names of Callback Functions by Using the Callback Set Method Part of the integration code may be generated by the CCG objects of the subcomponents. In some cases, the code of integration logic first chooses names for the callback functions and events triggers, and supplies the names to the CCG objects for the CCG objects' use in generating part of integration code. Alternatively, the service method of the CCG objects may choose names for callback functions, use those names in generating part of integration code, and returns the names to the ICCG for the ICCG's use in generating callback functions. Likewise, the CCG objects may get the names directly or indirectly. The integration logic may provide an XML string, which contains the names of callbacks or event triggers, an object which is able to return the names, an address of a variable where the name is stored, and an address of object, which is able to return the name.

(d). Use of Registration Class

Figure 8:
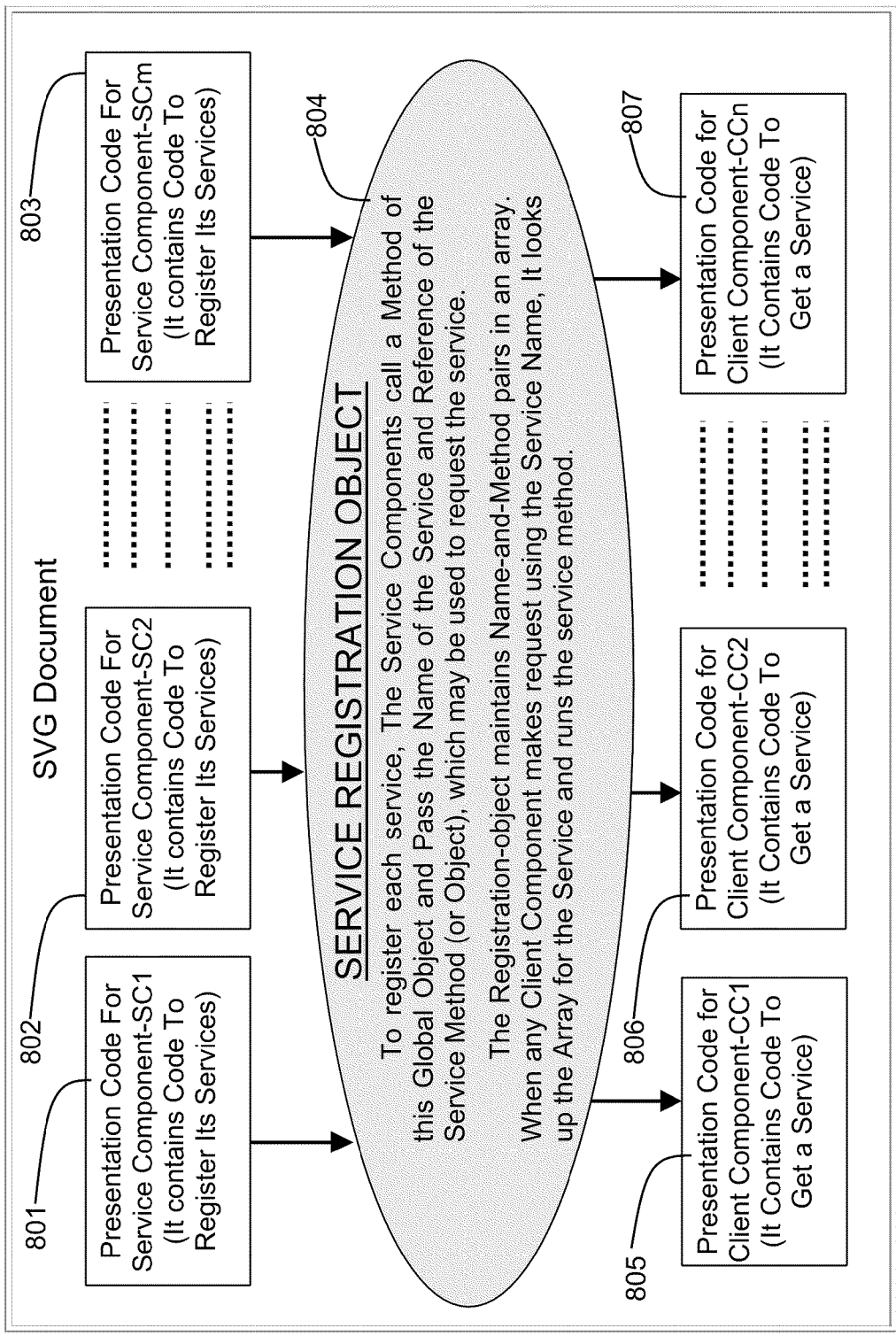
FIG. 8 shows the registering of service names and service methods with an instantiated object in an application component.

The SVG document may have global variables and objects. It is possible to define a service registration class (e.g., 'service_register_class') and instantiate a global object with a reserved name such as 'service_register_obj'. Now, any presentation code can access this object using this reserved name (one version of service registration class is disclosed in Appendix C). Multiple components or subcomponent class objects may be registered according to the general steps shown in FIG. 8. This figure shows that plural service components 801, 802, 803 are registered with the service registration object 804. Plural client components 805, 806, 807 may request services by using the associated service names.

The 'service_register_class' can be implemented so that it supports methods to register services with a service-name ID. Also, service can be accessed by methods using the service-name ID. Using this technique, any component can register its service with a unique name. If any other component needs that service, the component can look up the service using the name.

This name of the service registration object can be reserved so that the presentation code of plural subcomponents can register their services. At the beginning of the SVG document, the service registration object is instantiated.

var services_register_obj=new service_register_class( );

The CCG object can generate code to register its service with the 'service_register_object' with a service-name ID.

The following statement is used to add a service:

services_register_obj.add_service("ShoppingCart", shopping_cart_service);

The CCG objects that creates presentation code of the component knows the service-name ID, they can include the code to access the service:

services_register_obj.get_service("ShoppingCart", xml_data, callback_name);

Developers of both client components and server components may agree on the names of the services in advance.

To accomplish more complex and multi-faceted inter-component communication, the presentation code, which provides service, can register an object containing plural methods and variables. In response to a request, the lookup service returns an object, which contains service methods (or callback functions) and variables. The requesting component then gets the service methods or callback functions and the variables; and can invoke appropriate action method of the servicing component.

In the code of integration logic, the ICCG may use the service method names along with XML string variable names (based on predefined XML schemas) as parameters to the callback functions. The XML-data strings might be saved in the application code of subcomponents and used by JavaScript functions, which supports the communication between the presentation code of the subcomponents and the presentation code of the component.

There are many more methods, which may be used to get the named of service methods. For example, the CCG be coded in the CGM of the subcomponent with the names of service methods labeled with a reserved name. By designing, an ICCG contains the code to call the CGM of the subcomponent and storing the presentation code of the subcomponent in a string variable. The ICCG also contain the code to search for the reserved name and get the names of the service methods. After getting the names of the service methods, the ICCG then places the presentation code of the subcomponents at proper location of the container component code and starts writing integration code using the names.

(e) Communication with External Components.

After an ICCG generates functional presentation code of the container component. All service methods of its subcomponents and the container component may be accessed by external components or other web elements.

4. ICCGs and Integration Logic Examples

The ICCG disclosed in the preferred embodiment (FIGS. 9*a*, 9*b*) is also implemented in a Java class, which is extended from the base class AgileTemplate. The ICCG contains code of one or more methods of inputting or instantiating/initializing the CCG objects of subcomponents, and code of integration logic. It optionally contains the code of business logic.

An ICCG containing code of business logic is also an ACCG even though it gets the presentation code of subcomponents by calling CCG objects. Conversely, an ACCG, which contains code of integration logic, is also an ICCG whether the ACCG get the subcomponent CCG objects by instantiation or importation.

Example 4

Pseudo Code of a Simple ICCG

This example shows the pseudo code of a simple ICCG in JSP or Servlet using components as building blocks. The container CCG instantiates and initializes CCGs of two subcomponents: C1 and C2 and uses their CGM to generate the presentation code to present PC1 and PC2 and places the presentation code at appropriate location in its component code. The CGM of the larger ACCG ( ) may include the following pseudo code:

//Start of CGM:
Include container component code such as format and placement
//code to generate presentation code of object C1
Instantiate CCG Object C1;
Use the Container Object's Input data to Initialize C1;
Generate_Presentation_Code PC1: Call C1.CGM( );
Include container component code such as format and placement
//code to generate presentation code of object C1
Instantiate CCG Object C2;
Use the Container Object's Input data to initialize C2;
Generate_Presentation_Code PC2: Call C2.CGM( );
Include container component code including code for placement
// Write Integration Logic to integrate the subcomponents.
Get PC2-data: For example, a Service Method of PC2 from C2;
out.println ("function CB_of_C1_to_control_C2 (EvtDat) {");
Use the PC2-Data (ex: a service-method) to talk to PC2:
Generate code to control the component PC2,
Based on user selection (ex: EvtDat or events) on PC1.
out.println ("}"); // End writing the body of the Callback.
Get PC1's service-method from C1 to register a Callback,
Generate Code to Register 'CB_of_C1_to control_C2' With PC1;
// End of the Integration-code block
Include remaining container component code
//End of CGM The pseudo code shows how the subcomponent PC1 may be used to control the subcomponent PC2. To accomplish this, the ICCG contains code-sections that interact with the CCG-objects of subcomponents to generate the integration code. The code of integration logic calls the service method of C2 to get the name of the service method of the subcomponent PC2. The code statements in the integration logic, during execution, generate the body of a callback function CB_of_C1_to_control_C2, which may be used to call the service method of PC2. Then statement in integration logic calls the service method of C1 to get the name of service method of subcomponent PC1, which may be used to register the callback for the subcomponent PC1. Then statement in the integration logic uses the name of the service method of PC1 to generate more integration code to set the callback for PC1. In the resultant application code, callback may be triggered by an event (e.g. a user action) on the subcomponent PC1 or a change in the state in the subcomponent PC1. When the callback function is run, it calls the PC2's service method to control PC2.

Example 5

Pseudo Code for Simple Integration Logic

A sample version of the code of integration logic, which integrates subcomponents PC1 and PC2 of the example 4, is shown in the following pseudo code. It is assumed that in this example that PC1 initiates communication based on an event such as a user's action or state change and calls the service method of PC2.

10. String Second_comp_service_method=C2.getService Method Name( );
20. Out.println("function first_comp_callback_UNQ_ID (par1, par2) {");
30. Out.println(""+Second_comp_service_method+"(par2);"
40. Out.println("}");
50. String First_comp_service_method=C1. getCB_Add MethodName( );
60. Out.println(""+First_comp_service_method+"('first_comp_callback_UNQ_ID');");

The statement 10 in the Integration logic gets the name of service method of PC2 and saves the name in variable "Second_comp_service_method". The statement 20 picks a unique name by attaching a unique ID to first_comp_callback (e.g. first_comp_callback_UNQ_ID) for a callback function. Statements 20-40 print the body of the callback function. Finally the integration logic generates code that uses the service method of PC1 to set callback for the PC1.

Example 6

Pseudo Code of Integration Logic

Another version of the code of integration logic (for example 4), which should be placed in the CGM of the container CCG before the code to call the CGMs of subcomponents, is shown as follows:

10. String First_comp_callback_name=C1. getCallbackMethodName( );
20. Out.println("var service_method_UNQ_ID=functions( ) { };");
30 C2. setServiceMethodReference ("service_method_UNQ_ID");
40. Out.println("function "+First_comp_callback_name+"(par1, par2) {");
50. Out.println("service_method_UNQ_ID(par2);");
60. Out.println("}");

By running statement 10, the integration logic accesses C1 for the name of a method of PC1 and saves the name in variable "First_comp_callback_name". By using the method getCallbackMethodName, the ICCG requests the PC1 to choose a unique name for the callback function and include necessary integration code in the presentation code which allows PC1 to call the callback function for a given event. The method of C1 (i.e. getCallbackMethodName) also returns the name of the callback function to the integration-logic in the container ICCG.

The code of Integration logic in the ICCG picks up a unique name (service_method_UNQ_ID) for the function reference variable and generate a line of code which instantiates the variable and point to a null function. Then the statement of integration logic uses the service method to request C2 to assign the service method of PC2 to the function pointer variable. As discussed in CCG-class for "RotateBanner.java" for its method setServiceMethodReference, this causes the C2 to include code in the PC2, so that, the global variable "service_method_UNQ_ID" contains reference for the service method of PC2.

The statement 40-60 of the Integration logic generates the callback function using the name stored in variable "First_comp_callback_name". The function calls the service method reference stored in variable "service_method_UNQ_ID". Since, the variable is assigned to the PC2's service method upon generation of PC2, the PC1's callback calls the PC2's service method.

Each CCG may contain the code of plural service methods, which may be used to get information from the CCG object or pass the information to the CCG object by using the set method. To integrate a subcomponent with other subcomponents or the container component, the code of integration logic may use one or more available service methods of the CCG object of the subcomponent.

Example 7

RotateBanner.java and ShowLayer.java

RotateBanner.Java (Appendix E) is a CCG class for the RotateBanner component. The application code generated by RotateBanner.java and ShowLayer.Java have been discussed (Appendices A,B). The class defines the variables for storing input subcomponents, preference data, and configuration information. The CCG has constructors, methods of initializing the variables, and the CGM for generating the presentation code. It uses the data, objects and subcomponents in the class variables to generate its presentation code.

Appendix E shows a simple tested SVG component code of the RotateBanner. The CGM for RotateBanner first prints the "class definition" section of the container component using private function generate_class_def(out, doc_info). The "class definition" section may not be included in the code, if the class definition is already included in the web document by another earlier object instance of this class. The count of the input subcomponents and the list of the CCG objects for the subcomponents are stored in the class variables. Then, the CGM uses the information on count and list of objects to generate for code to instantiate and initialize an object for RotateBanner class (Section Three in the SVG document). Then CGM generates code to present the component, and each of its subcomponents (Section Four in the SVG document). To get the code for each subcomponent, it may use the CGM of each of the input subcomponents.

The CCG code appends UNQ_ID to all names of global variables and functions to make the names unique and exclusive in the SVG document.

The CCG class supports (1) methods of getting names of service method of the component generated by the CCG object, and (2) methods of passing information about external components (or code) such as callbacks to be invoked by the generated component. This Java-Class supports following methods getBannerUpdateMethodName( ), which returns the name of the service method of the presentation code. Since the names of presentation code's objects and service methods are already defined in the class definition and instantiation, the CCG only need to append the UNQ_ID to the object name and returns the name (e.g., the name with appended UNQ_ID), which can be used to access the service of the component. Since all the objects are global in the SVG document, the service method of this object can be called anywhere in the SVG document.

The CCG class supports service method setServiceMethodReference( ), which saves a variable name in the class variable Service_func( ). If the string Service_func is not null, the CGM generates additional lines of code in the components to save reference of the service method in this variable, whose name is stored in Service_func. This is an alternative method to use the service method of the component.

The CCG may use alternative methods to accomplish the same task such as registration of a callback for a component. The container CCG may use getCB_AddMethodName( ) to get the name of the service method and use this method to register a callback. Alternatively, the container CCG may use Java-object method setCallBackName(String cb_name) to call the CGM to include necessary code in the presentation code in order to call the JavaScript method whose name is given in the parameter "cb_name".

Like RotateBanner, the CCG class for the ShowLayer component (Appendix G) also contains class variables and set-methods for initializing the variables. It also implements the CGM. This Java class also supports a method getShowLayerName( ), which returns the name of the service method of the presentation code of the component. Since the names of the object and service methods are already known, it only need to append the UNQ_ID to the object name and returns the name (e.g., the name together with appended UNQ_ID), which can be used to access the service of the presentation code. It also supports methods getSwitchStateName( ) and getCB_AddMethodName( ), which also return the names of the service methods of the component presentation code.

The CCG may use alternative methods to accomplish the same task such as registration of a callback for a component. The container CCG may use getCB_AddMethodName( ) to get the name of the service method and use this method to register a callback. The Java class also supports a method setCallBackName(String cb_name), which, upon being called, can initialize the variable "callback" to the string given in "cb_name". Alternatively, the container CCG may use Java-object method getCallBackName ( ), which picks a unique name for callback, assigns the name to class variable 'callback', and returns the name of the callback function. The both functions save callback function name in class variable "callback". If this variable is not "null", which causes the CGM generate additional JavaScript code to set the callback function, whose name saved in the variable "callback".

An alternative implementation is disclosed in Appendix F.

5. Basic Types of ICCGs

ICCGS may be classified into the following types: (a) non-reusable ICCG, (b) reusable ICCG, (c) ICCG integrating the subcomponents, the CCG objects of which are locally instantiated, and (d) ICCG integrating the subcomponents, the objects of which are imported from external sources. All ICCGs contain code of integration logic and, optionally, code of business logic.

(a) Non-Reusable ICCGs

This type of ICCG is not implemented in object class. Therefore, it cannot be imported into another container component as a subcomponent by any importing method. One example of such ICCG for Show_layer and Check_box is shown in Appendix Q. Any component ICCG may be implemented in non-class, rendering it non-reusable. However, the presentation code generated by such an ICCG may be saved in a file for use by other special ICCGs. For example, a servlet or JSP for generating a web document, which uses one or more CCG objects to generate their components and integrates the components, is a non-reusable ICCG.

(b) Reusable ICCGs

If the ICCG is implemented in a class definition, the component may be conveniently used as a subcomponent by any container CCG, including ACCG and ICCG, as long as the ICCG is a right component for the container CCGs in the business point of view. A reusable ICCG may contain replaceable or irreplaceable subcomponents, depending upon how it gets the CCG objects of subcomponents.

Figure 10:
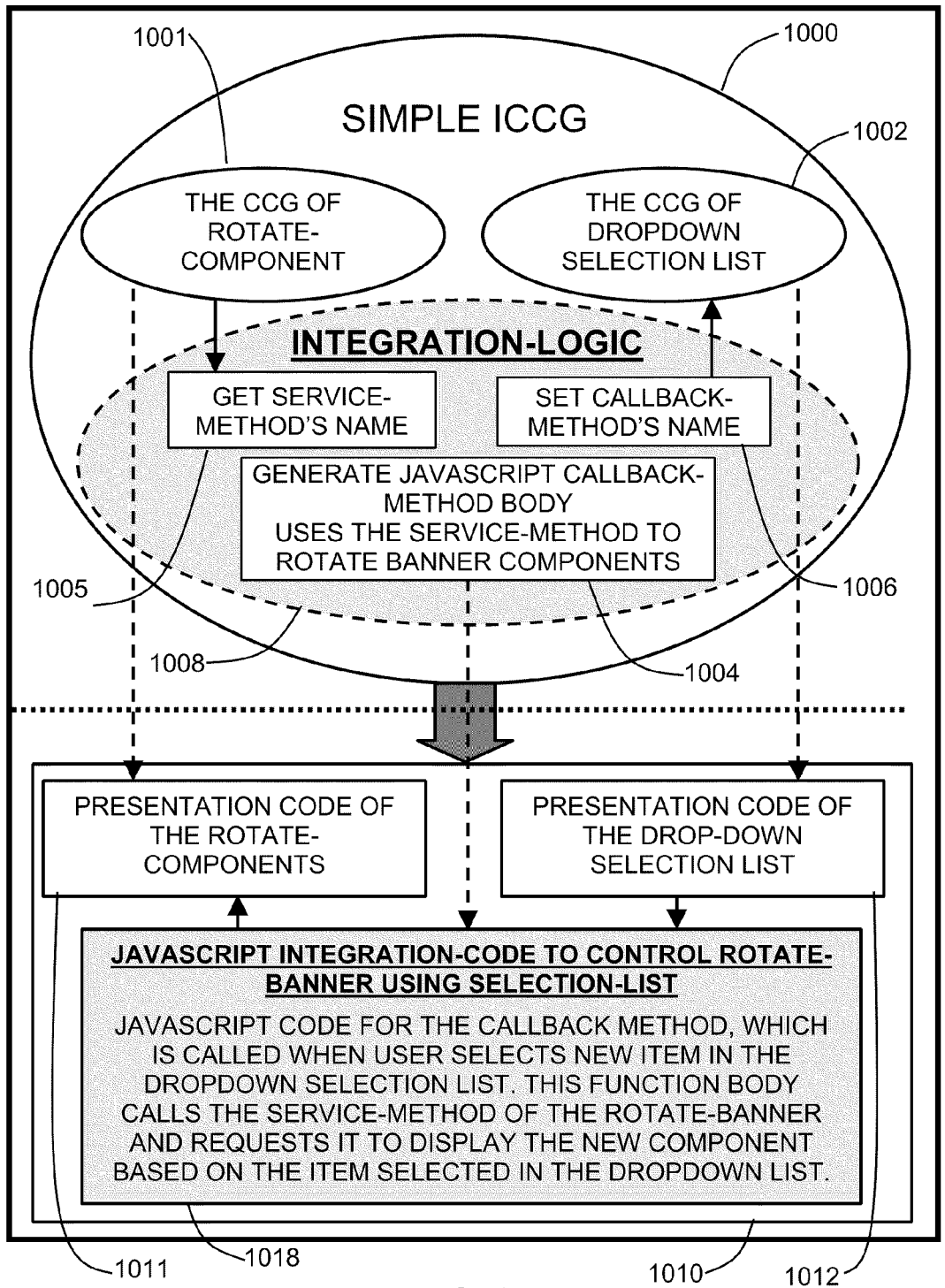
FIG. 10 shows the integration of two subcomponents by an ICCG.

In one of the preferred embodiments, reusable ICCG is implemented in Java class and contain code to input at least one instantiated and initialized CCG object and the code of integration logic for generating necessary integration code (FIG. 10).

Figure 9A:
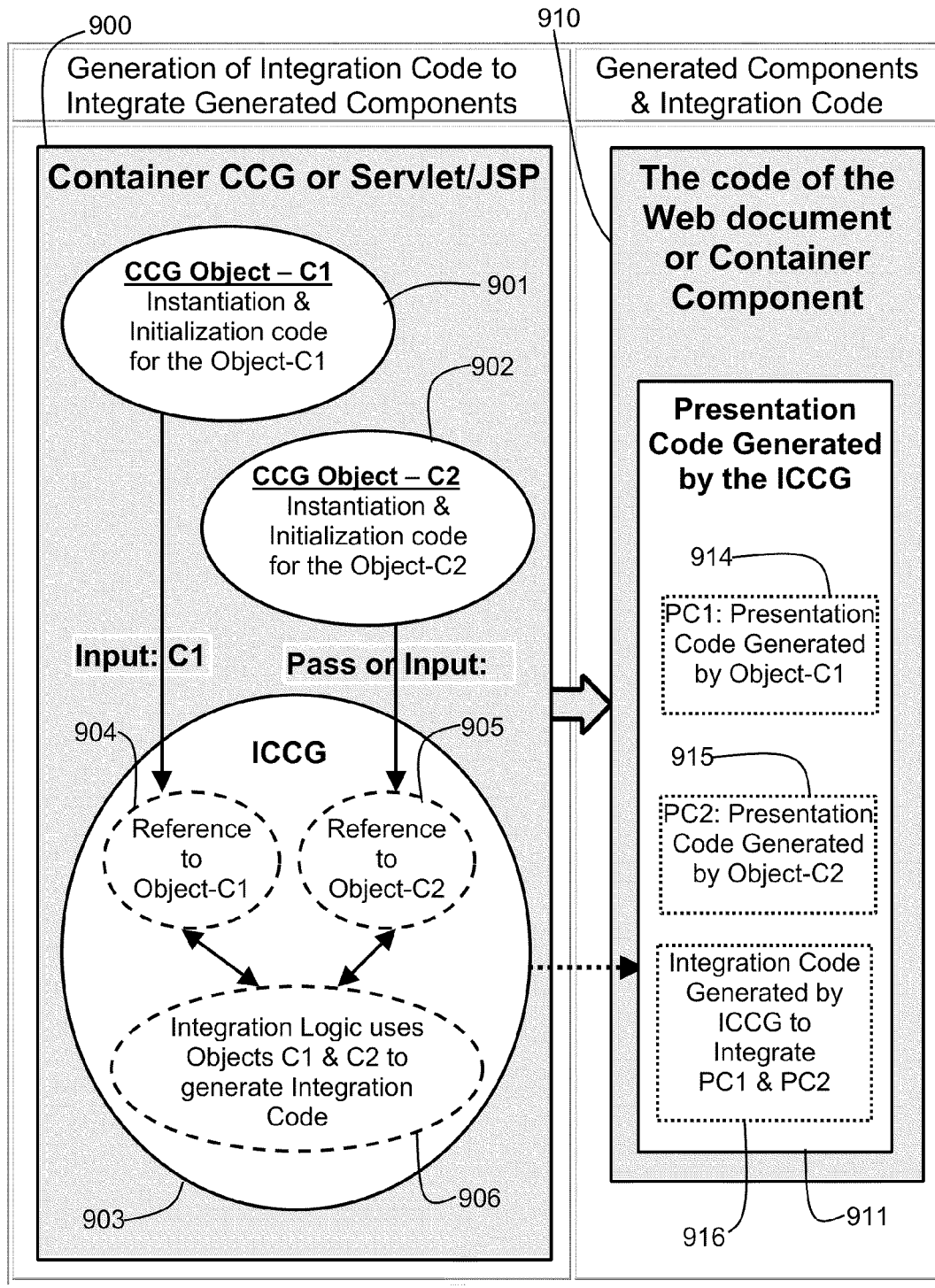
FIG. 9a shows an ICCG with the CCGs of subcomponents being instantiated locally.

(c) ICCG Integrating the Subcomponents, the CCG Objects of which are Instantiated Locally This type of ICCG has subcomponents, which are tightly molded in the container component (FIG. 9a). The subcomponents cannot be replaced by other subcomponents. The container ICCG may be reusable or non-reusable depending upon whether it is implemented in object class. The following example shows this type of ICCG.

Example 8

Pie Chart

The presentation code of a full pie chart component is shown in the FIG. 3a and some pseudo code is followed.

The presentation code of full pie chart 310 comprises the presentation code of the subcomponents such as legend 311, info-table 312, and pie slices 312. It also contains integration code 315 and other miscellaneous code to define the location of the subcomponents. When the mouse moves over any of the legend items, the presentation code calls the pie chart subcomponent to highlight the slice corresponding to the item. Whenever the subcomponent of pie chart highlights a slice, it calls the service method of info-table, and passes relevant information such as percentage in the parameters in order to display the information. This interactive functionality, which is a reflection of underlying inter-component communication, is rendered by the integration code. A version of the pseudo code of the container CCG that create the pie chart is as follows:

<g transform="translate(X-Loc Y-Loc)">

<script> <! [CDATA [

// The JScript methods & Integration code goes here.

]]> </script>

<!--Coordinates for sub-groups are with respect to container Group-->
   <g transform="translate(5 35)">
   // PC1:Presentation-Code for Legend subcomponent goes here.
   /*** May use the CGM( ) to get the subcomponent's code::
   <%// For Example: Instantiate a Legend Object:
   LegendTemp LC=new LegendTemplate(legend_array, n);
   ... Include code to initialize & configure the Object—LC . . .
   LC.CGM (out, ses_obj); // Generates the code %> ***/
   </g>
   <g transform="translate(90 30)">
   // PC2: Presentation Code for Chart subcomponent goes here.

```
</g>
<g transform="translate(25 320)">
// PC3: Presentation Code for Table subcomponent goes here.
</g>
<g transform="translate(5 5)">
// The SVG code to present the Title goes here.
</g>
... ... ... ... ... ...
... ... ... ... ... ...

<script> <! [CDATA[ . . . More Integration code . . .

]]> </script>
</g>
```

Each of the subcomponents is defined by tags <g> and </g>, forming a chuck of code (also known as a group for each subcomponent). In the miscellaneous code, the location of each of the subcomponents is defined by the X and Y values in the group's attribute transform="translate(X Y)" with respect to top left corner of the container component.

The container CCG instantiates and initializes each of the CCGs of the subcomponents. In generating the presentation code of a subcomponent, the container CCG calls the CGM of the subcomponent CCG within the group code as follows:

out.println("<g transform='translate(X_LOC Y_LOC)'>");
Sub_comp.CGM(out, doc_info);
out.println("</g>");

Those three statements create a group of SVG code within the tags of <g> and </g> with the body of the presentation code of the subcomponent. The displaying location is given by the X_LOC and Y_LOC with respect to the enclosing component.

Upon a user action on any item of the legend, the JavaScript mouseover event callback function of the legend calls the service method of the subcomponent of the pie chart to highlight the slice. When mouse is moved over the slice, the slice is highlighted. The pie chart subcomponent contains a method, which is to register a callback function, which is called, when the service method to highlight slice is executed. The container CCG may use this method to register a callback function. Then the container CCG implements and generates this function body that calls the service method of the Info-table to display the information about the pie slice.

In the Legend and Info-table, which uses irreplaceable subcomponent, a developer cannot replace the subcomponent but can provide data by using the methods provided by the container CCG to customize the Legend and Info-table to effectuate their look and feel.

In using irreplaceable components to build components, the developer knows whether a subcomponent is proper component.

(d) ICCG Integrating the Subcomponents, the CCG Objects of Which are Imported from External Sources.

Figure 9B:
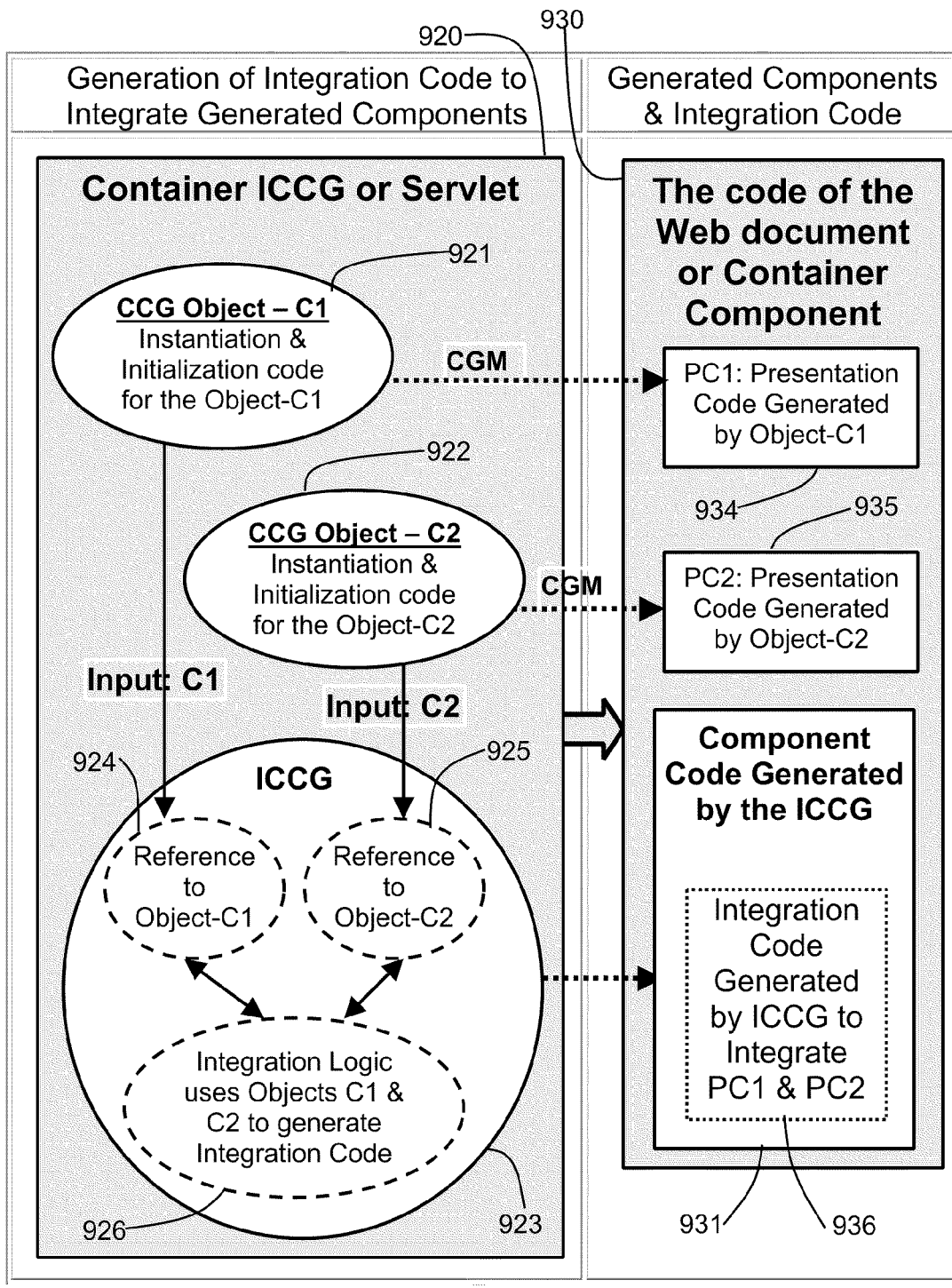
FIG. 9b shows an ICCG whose CCG objects are used to generate the presentation code of subcomponents and integration code.
Figure 9C:
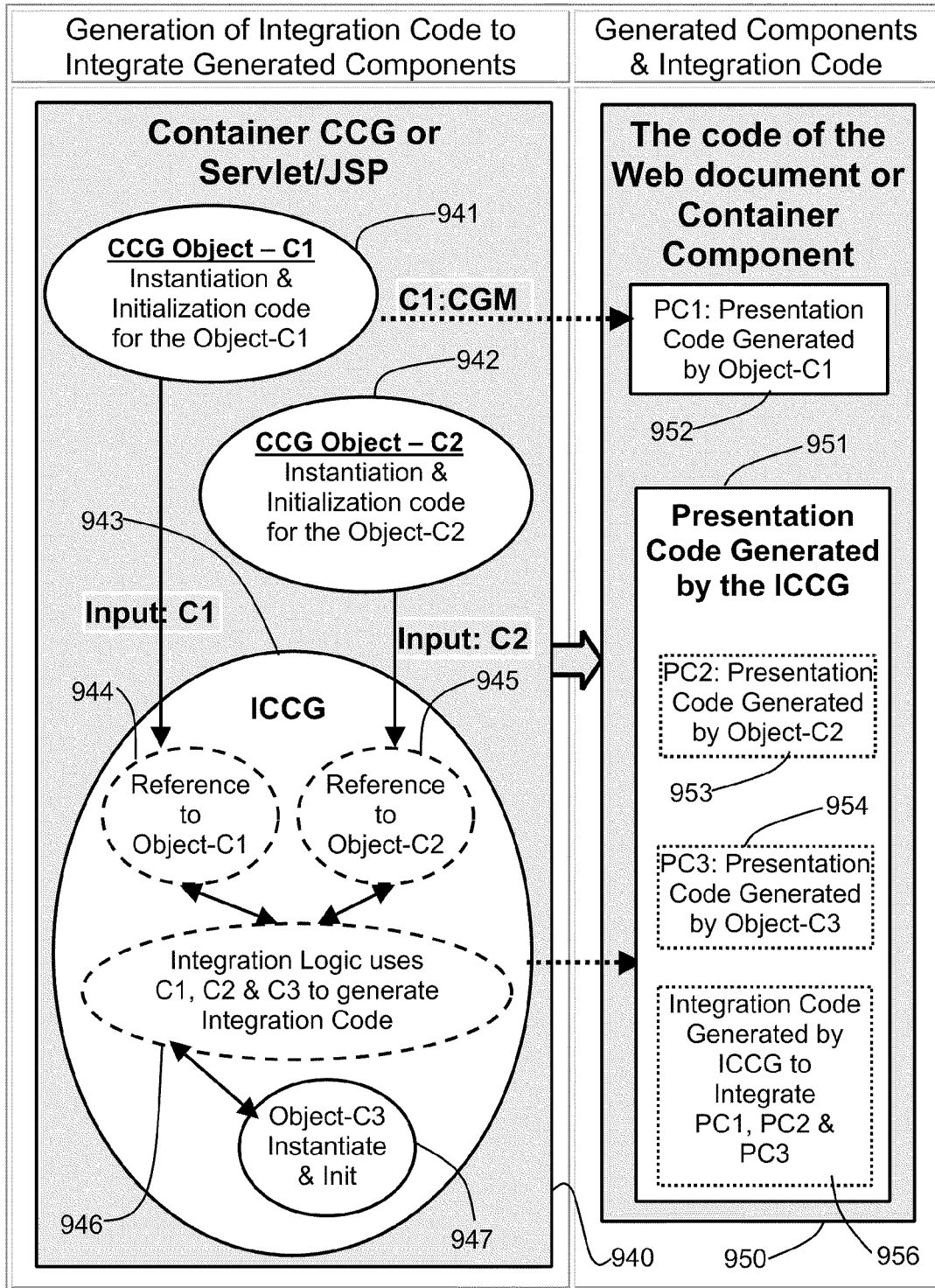
FIG. 9c shows an ICCG whose integration code is generated by using imported CCG objects while presentation code of one subcomponent is generated outside the ICCG.

This type of ICCG gets the CCG objects of subcomponents by any importing method provided in the programming language that is used to code the ICCG (FIGS. 9b, 9c). If the ICCG is coded in Java, the CCG objects may be input by using set methods.

FIG. 9a depicts an outer container CCG 900, which comprises an inner container CCG 903 and two CCGs (901 and 902). The outer container CCG 900 generates application code for outer component 910. The server code for the outer CCG 900 comprises code for instantiating and initializing the CCGs 901, 902 and 903. The outer container CCG also comprises server code for inputting CCGs 901 and 902 using input or set methods of the inner container CCG 903. The inner container CCG 903 saves the references to the CCGs 901 and 902 as the references 904 and 905, respectively. The outer container CCG 900 comprises server code for calling the CGM of the inner container CCG 903 to generate the application code of the inner container component 911, which is a subcomponent of the component 910. The CGM of the inner container CCG 903 comprises its own server code for calling the CGM of each of the referenced CCGs 901 and 902, respectively, to generate the application code of the subcomponents 914 and 915. The CGM of the inner container CCG 903 also comprises integration logic code 906, which interacts with the CCGs 901 and 902 to generate the application code 916, which is necessary for inter-component communication or data exchange between the subcomponents 914, 915 and the container component 911.

FIG. 9b depicts an outer container CCG 920, which comprises an inner container CCG 923 and two CCGs (921 and 922). The outer container CCG 920 generates application code for the outer component 930. The server code of the outer CCG 920 comprises the code for instantiating and initializing the CCGs 921, 922 and 923. The outer container CCG 920 also comprises server code for inputting the CCGs 921 and 922 using input or set methods of the inner container CCG 923, and stores the references to the CCGs 921 and 922 as the references 924 and 925, respectively. The CGM of the outer container CCG 920 comprises server code for calling the CGM of each of the CCGs 921 and 922 to generate application code for each of the subcomponents 934 and 935, respectively. The outer container CCG 920 comprises server code for calling the CGM of the inner container CCG 923 to generate application code of the inner container component 931. The CGM of the container CCG 923 also comprises integration logic code 926, which interacts with the references 924 and 925 to generate integration code 936, which allows inter component communication between the subcomponents 934, 935 and the container component 931.

FIG. 9c depicts an outer container CCG 940, which comprises an inner container CCG 943 and two CCGs (941 and 942). The outer container CCG 940 generates application code for the outer container component 950. The server code of the outer container CCG 940 comprises code for instantiating and initializing the CCGs 941, 942 and 943. The CCG 940 also comprises server code for inputting the CCGs 941 and 942 using input or set methods of the inner container CCG 943 and server code for saving the CCGs 941, 942 as the local references 944 and 945, respectively. The CGM of the outer container CCG 940 also comprises server code for calling the CGM of the CCG 941 to generate application code of the subcomponent 952. The CCG 940 also comprises server code for calling the CGM of the inner container CCG 943 to generate application code of the inner container component 951. The CCG 943 comprises server code for instantiating and initializing the CCG 947 and server code for calling each of the CGMs of the CCG 945 and 947 to generate the application code of the subcomponent 953 and 954 respectively. The CGM of the CCG 943 also comprises the integration logic code 946, which interacts with the CCG objects 944, 945 and 947 to generate application code 956, which allows for communication between the subcomponents 952, 953, 954 and the container component 951.

By designing the code of integration logic, ICCG can generate a variety of integration code to establish any of those basic types of the inter-component communications. The only difference in the integration code is to use different names of the service methods of subcomponents and to create different statements for invoking the callback functions, which in turn call the service methods of other subcomponents or service methods of the container component.

In generating integration code, the container CCG uses one or more CCG objects of subcomponents and integrates the subcomponents. The container CCG needs to interact with CCG objects in a proper way to get the necessary information such as names of service methods or set callback functions and use the information to write integration code.

In the cases where the CCGs of subcomponents are instantiated within the container ICCG, the ICCG class code picks up only the CCG objects of appropriate subcomponents as subcomponents from the business point of view. The ICCG can get the names of service methods or to choose the names of the callback functions in generating proper integration code. The ICCG component such as full pie chart chooses the CCGs of proper subcomponents such as Legend and Infotable, and, therefore, can use the supported methods of respective CCGs to access the component integration data such as the names of service methods of the subcomponents.

In other cases, the ICCGs of container components are pre-built and stored in library to be used as container components of other CCG subcomponents. The container ICCG needs to integrate subcomponents generated by the CCG objects which is passed to the container ICCG by, for example, set methods, the ICCG needs to use the CCG objects that are proper building parts. For example, a shopping cart can only be integrated with shopping items subcomponent but not with weather condition subcomponent. In this case, the ICCG needs to know whether a subcomponent is right building part and the data exchange interface the subcomponent uses. There are several methods for assuring correct matches, as discussed later.

Example 9

DropDownSelectionList and Rotate-banner

In one embodiment of the present invention, the container CCG (Appendix H, FIG. 10) takes a list of strings for a drop down list subcomponent and an array of subcomponent CCGs. When this container component is displayed in an SVG viewer, a user may click on the drop down list, and selects a new item shown in the drop down list, the SVG viewer hides current subcomponent and displays the newly selected subcomponent.

The container CCG class has Title variable to store a string for title of the container component, an array of string names[ ], an integer count for the number of the items in the drop down list, and an array of AgileTemplate CCG sub_ACCG_list[ ]. It has a constructor, which can take four parameters: title, an array of strings, an integer, and an array of CCG objects. The container CCG class uses CCG for DropDownList and RotateBanner, which are defined as an extended class to the AgileTemplate.

In the container CGM, a CCG object of a dropdown list DDList and a CCG-object of RotateBanner RB1 are instantiated. The code of integration logic 1008 in the container CCG then gets service method of RotateBanner 1005 and places the name of the service method in variable rb1_service_name and uses a unique name for the callback of the drop down list. It then creates the body of the callback, which is part of the integration code in the application code using a series of out.printin statements. It also registers this callback 1006 in the subcomponent of DDList using its CCG object's service method. The container CGM calls the CGM of the RotateBanner once and the CGM of the DropDownList once. The components are presented in the locations of choice.

In Appendix I is a sample JSP file. This container CCG is used to generate stock information. It initializes four variables, which are used as the parameters for the container CCG's constructor. The string variable title is assigned with a title of the component. Five ticker names are placed in a name array. Then, five ACCG objects are instantiated for the five tickers, respectively. An array of the objects of component ACCGs is also instantiated. It finally instantiates the container CCG's constructor with the four parameters and calls the CGM of the container object.

This container CCG may be used to display the weather conditions for five zip code areas after corresponding changes are made in title value, constructor used to instantiate the objects of the subcomponents. In this case, the parameter passed in the constructor of the subcomponents is the ACCG objects of weather, each of which takes a zip code rather than a ticker. Appendix J contains a JSP example.

Example 10

Stock Quote

Figure 11:
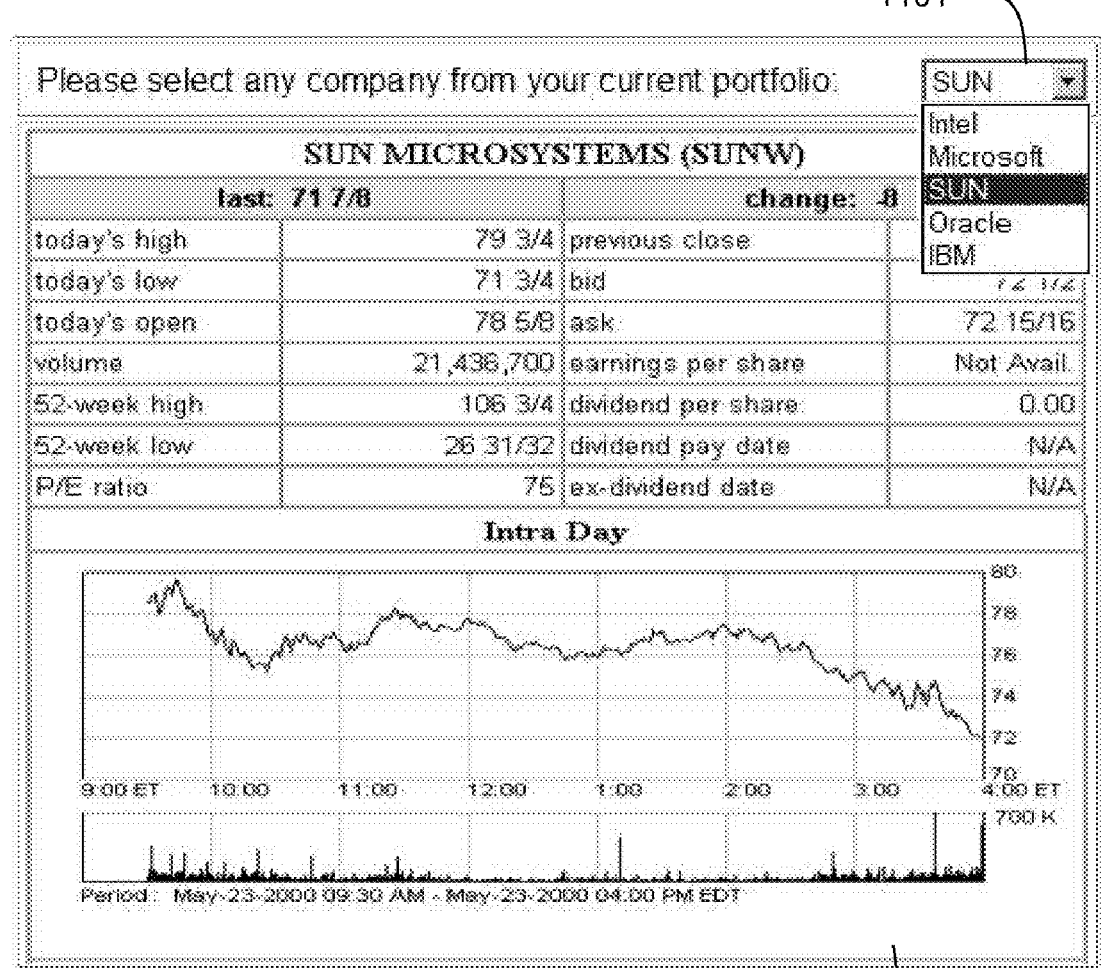
FIG. 11 shows presentation component to present stock portfolio created by an ICCG using Rotate-banner and Drop-down-list.

One example used in one embodiment of the present invention is shown in FIG. 11. This component displays a stock portfolio chart and displays all of the stocks in the customer portfolio in a pull-down selection menu 1101. When the customer clicks on the ticker name in the drop down menu, it displays the stock quotes 1100 for the company associated with the selected ticker. This component CCG is built using two CCGs: Rotate-banner CCG and Dropdown selection CCG. The Rotating-banner CCG takes a list of subcomponents and generates the presentation code that displays one subcomponent at a time.

The container ICCG contains the code of integration logic, which, upon execution, generates the body of a callback function in JavaScript. The callback function uses the Rotate-banner's service method to display respective stock quote.

The presentation code of Rotate-banner supports the service method, which is called to hide the currently displayed component and display a new subcomponent when the customer clicks on the new item. The dropdown selection CCG, which takes a list of strings, generates presentation code that displays the dropdown selection list. When the customer selects any item from the list, the presentation code calls the callback function to notify the new selection.

The container CCG gets the name of the service method of the presentation code from Rotate-banner's object by using its service method. The container CCG chooses a name and uses it as the callback function's name. In the body of the callback function, the code calls the service method of the Rotate-banner component. The container CCG uses the service method of the class object for the selection menu and requests it to register the name as a callback function in the presentation code it generates for the selection-list. Hence, whenever user selects new item in the selection-list component, the presentation code calls this callback function. Any presentation code in the web page can use the name of callback function to access the service of the Rotate-banner component.

The container ICCG contains code of application logic, so it is also an ACCG. The input to the ACCG may be account number of the user. The code of application logic in the container ACCG uses the account number to get the list of companies in the user's portfolio for display.

The Appendices N and O provide examples for class implementations of simple ICCGs. The Appendices R and S provide examples for non-class implementations of simple ICCGs.

6. Integration Using Component Integration Data

The developer who designs a container ICCG, which uses a CCG object of a subcomponent, needs to know whether the subcomponent is a proper building part and the data exchange interface the subcomponent uses. The developer, who uses pre-built subcomponents CCGs, needs to know the component and data exchange interface of the CCG objects of the subcomponent. Methods available for determining component compatibility includes (i) implementing abstract component class supporting for particular data exchange interface, (ii) placing component name and the component integration data in the presentation code of the subcomponent generated by the CCG object, where the component integration data can be accessed by the ICCG.

(a) Use of Abstract Component Class in the Subcomponent

A proper integration requires both a right subcomponent and compatible data exchange interface between the ICCG and the CCG object of the subcomponent. A data exchange interface may be built into an abstract class from which a component is derived.

By way of example, the class of ShoppingItems subcomponent may be derived from abstract class ShoppingItemTemplate, which may support, for instance, service method, which may be used to set a callback function in the presentation code of the subcomponent for the item. The integration logic in the ICCG may use the Abstract Classes data exchange interface in order to call the service methods of the CCG object.

While in this example, the abstract component class uses only one service method for establishing the data exchange interface in the resultant application between two subcomponents, the abstract class may support plural methods and data variables, depending upon the nature of the subcomponents and integration method.

The developer of the CCG object may use any image to present the ShoppingItem and include any other information to be filled in the XML string. There is no restriction on the presentation or business logic of the shopping-item as long as the CCG object is of a subclass of ShoppingItem class. The ShoppingItem class ensures that the ICCG can register callback functions and the subcomponent can be integrated properly.

The abstract class in this case is intended only for suitable subcomponents, which use the data exchange interface. The name of ShopItemTemplate should not be used by a second abstract class for the subcomponents that use different data interface. Therefore, the ICCG and the subcomponent CCGs of type abstract class are designed for each other. The ShoppingCart ICCG accepts only the objects of subcomponents CCGs that are derived from the same abstract class. Because the data exchange interface is implemented in the abstract class, the component class derived from the abstract class supports its data exchange interface.

Abstract class implemented in the CCG objects used by ICCG may be a subclass of the abstract class, AgileTemplate, which define abstract method CGM. Therefore, an abstract class may contain both the elements used in the AgileTemplate class and the elements of abstract component class necessary for the integration logic. Therefore, such combined abstract class can serve to support both CGM and necessary data exchange interface for ICCG to integrate the subcomponent.

Figure 12:
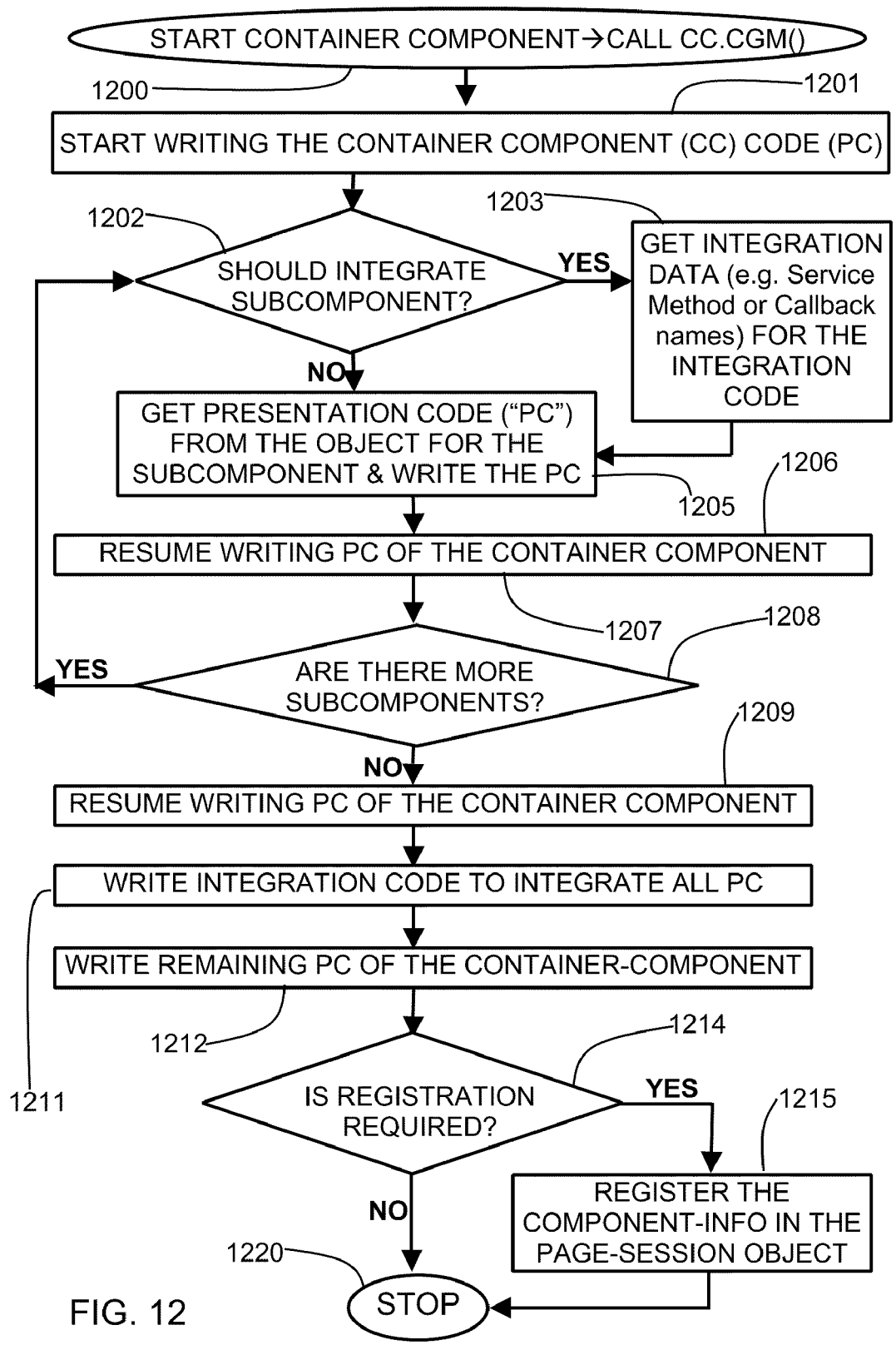
FIG. 12 shows the process used by the CGM of an ICCG to generate presentation code with integration code.

FIG. 12 shows the general steps of CGM of an ICCG when the CGM is called. The process is similar to the one for the black box assembling (FIG. 7) except in two aspects: The CGM gets component integration data at step 1203 from the object if the subcomponent belongs to appropriate component class. If the object is unknown class or a string buffer, it may put the presentation code into a string buffer and read the component integration data at step 1203 from the presentation code. The other difference is that it generates integration code at the proper location at step 1211.

Example 11

Pseudo Code for Abstract Class that Extends AgileTemplate

```
public abstract class ShopItemTemplate extends AgileTemplate {
    public abstract void addCallBackOnSelection (String cb_name);
    public abstract String getCB_AddMethodName( );
}
```

The example shows a method for setting a callback function. The presentation code of the item calls the callback whose name in variable "cb_name" up on selection to buy the item. An alternative method in the third line may be used to get service method name of the presentation code and use the name to generate integration code to register a callback for the subcomponents.

Example 12

Shopping Cart

Figure 13:
FIG. 13 shows shopping cart containing shopping table/invoice and shopping items.

The container CCG of ShoppingCart uses a list of the CCG objects of ShoppingItems (1301, 1302, 1303) and a CCG object of Invoice/Table 1304 subcomponent and generates the presentation code of the ShoppingCart component (FIG. 13). The ICCG of ShoppingCart contains constructors and methods for inputting an array of CCG objects of the subcomponents.

The CCG of ShoppingCart may be implemented to accept only the objects of the CCGs derived from given abstract classes. The CCG of ShoppingItem subcomponents and the CCG of Invoice/Table subcomponent need to be integrated. To accomplish this, the CCG identifies component integration data needed to integrate each of the subcomponents. This may be accomplished by using two abstract java classes: one abstract CCG class for Invoice/Table that exports a service method to add an item to the list of selected items to purchase; and another abstract CCG class for ShoppingItem that accepts a callback function name, which the subcomponent calls when the ShoppingItem is selected to buy.

Abstract class for CCG for Invoice/Table component contains a service method, which may be called to return the name of the service method of the subcomponent of the Invoice/Table. The service method of the Invoice/Table may be called to add an item to the ShoppingCart, and pass the information such as price, quantity and discount about the item in the parameters of the service method. One of the parameters of the service method is a variable that has reference to an XML string, which contains the information (clear and defined). The service method of the CCG object of Invoice/Table component may add the XML-string to an array for each item that is added to ShoppingCart, and update the invoice of the Invoice/Tale based on the items in the ShoppingCart. Whenever this service method is called to add a new item, the service methods updates the XML-string array and Invoice to reflect the addition so that all items are in the invoice.

The abstract CCG class of the shopping item may support a method to choose a name for the callback function for the ShoppingItem component. Optionally, this CCG may further support methods that set data values of variables such as price, options and discounts to create and manipulate the XML string that contains the information about the ShoppingItem. This XML-string is placed in the presentation code of each ShoppingItem. The component of ShoppingItem calls the callback when the shopping item is selected to buy. Also, the abstract class may contain data validation method to ensure the application data supplied by the ACCG of shopping item is correct and complete before the XML string is placed in the item's presentation code. This data validation method uses pre-defined XML schema to validate the XML-string. A data validation method in the abstract class should cause the program implementing the container CCG to exit or flag errors appropriately when the ACCG of shopping items fails to supply all necessary data to build the XML-string. This XML-string is used as a parameter in the callback function to pass data from Shopping-item.

The two abstract classes, shopping-cart and shopping-items, assure that the ICCG gets all the necessary component integration data for use in integration. The container ICCG generates the integration code. The component for each shopping-item calls the callback when the item is selected to buy. The ICCG implements the body of the callback, which calls the service method of the Invoice-table to add the item to its list.

Example 13

Integration Logic in Shopping Cart

Pseudo code is used to show integration logic used in the ICCG for the Shopping Cart in the above example. The ACCG of presenting the shopping-items is derived from its abstract class, thereby providing necessary component integration data to set a callback, and the callback is called with respective XML string as a parameter upon user's selection to buy each of the items.

10 String IT_SM=IT.getAddShoppingItemMethod( );
20 out.println("function add_item_to_invoice(item_bar_code, xml_data) {"
30 out.println(""+IT_SM+" (item_bar_code, xml_data);");
40 out.println("}"

Statement 10 gets the name of the service method of the presentation code of Invoice using the service method IT.getAddShoppingItemMethod( ). Statements from lines 20 to 30 generate the body of the callback function in JavaScript and place the function in presentation code of the container ICCG. Assuming that name of the service method is "AddToInvoice_UNQ_IDX", statement 10 gets the name and stores it in string variable "IT_SM". When statement 30 is run, the ICCG prints the value of "IT_SM", which is "AddToInvoice_UNQ_IDX". Therefore, the body of the callback function is:
function add_item_to_invoice(item_bar_code, xml_data) {
AddToInvoice_UNQ_IDX(item_bar_code, xml_data);
}

Then, the ICCG registers the callback function in the application code for each of the shopping items by a loop. This function causes the CCG of the item to include additional code in its presentation code to call the callback function upon user selection or action.
for (int I=0; I<count; I++) {
Items[I].addCallBackOnSelection("add_item_to_invoice");
}

The callback function calls the service method of the subcomponent Invoice/Table. The ICCG sets the callback function for each shopping item's subcomponent. Upon selection, the presentation code of each shopping Item calls the JavaScript callback function 'add_item_to_invoice', which adds the item to the Invoice/Table using the service method of the Invoice's presentation code.

7. Data Exchange Mechanisms Placed in the Application Code

The integration logic is responsible for generating necessary integration code, which is responsible for the inter-component communication. Therefore, in designing the code of integration logic, it is also necessary to understand data-exchange mechanisms. The mechanisms include (1) use of XML strings, (2) use of common variables of multiple components, and (2) use of hidden fields in HTML code.

(a). Use of XML Strings

The subcomponents of a container component call each other's service methods through callback functions in the application code. The parameters for the service methods and callbacks may be variables, arrays or XML strings. By designing the code of integration logic and CCG class for subcomponents, application developers can define a schema of XML data to be placed in the application code for data exchange between two subcomponents. An XML string may be used to store a plurality of variables/parameters, thereby reducing the number of variables/parameters.

By way of example, the XML string for the shopping cart and shopping items in the application code contains data of price, discounts and inventory. The abstract class of the shopping item may support methods that set data values for variables such as price, options and discounts, which may be used to create and manipulate the XML string, and place the XML string in the presentation code of the subcomponent.

If a user selects an item to buy in a shopping cart application, the presentation code of the item calls a 'ShoppingCart' service method and send the XML-string comprising pricing, name, and discount to the 'Shopping Cart' using the service method so that the service method can update the invoice.

Optionally, the abstract class can have data validation method to ensure the correctness and completeness of the application data supplied by the ACCG of shopping item before the XML string is placed in the item's presentation code. This data validation method uses pre-defined XML schema to validate the XML-string and cause the program implementing the abstract class to exit or flag errors appropriately when the ACCG fails to supply all necessary data for the XML-string. This XML-string is used as a parameter in the callback function to pass data from Shopping-item to Shopping-cart. The callback function is called when an item is selected to buy and the XML string is used to transport data in the application code.

(b). Use of Common Variables for Data Exchange

If the subcomponent A changes the value of variable X as a result of a user's action and if the variable containing the changed value is used by subcomponent B, data exchange between two subcomponents has occurred. In this case, the name of common variable X should not be changed to be unique. To prevent the name from being changed by the service method of attaching a unique index number or string in subcomponents, variable X should take a reserved variable name so that the name is not changed in any of the subcomponents.

(c). Use of Hidden Fields for Exchange Data

If the application code contains HTML code, data may be placed as strings as hidden fields. Putting data in hidden fields do not affect the view of the component and yet, the data can be used by other components.

8. Use of Component Integration Data in the Presentation Code of Subcomponents

In a case where it is difficult or even impossible for ICCG to access the CCG objects of subcomponents, a different method is used. By way of example, if the presentation code of a subcomponent has been generated and stored in a file, the ICCG cannot access with subcomponent CCG objects. In this case, the component integration data may be embedded in the comment lines of the presentation code so that the data is invisible under the viewer, but can nevertheless be used by the container ICCG. The developer, who designs the container ICCG, can use the embedded component integration data in designing the code of integration logic. In this case, the developer needs to write down code to copy the presentation code from the file to the presentation code of the container component, and the code to use the component integration data to generate required integration code. Since the component integration data is embedded in the presentation code of subcomponent, the ICCG may also comprise service methods for extracting the component integration data before passing it to the application code.

By way of example, the component integration data of the Show-layer component may be in the form of name-value pairs, as follows:

COMPONENT_INTEGRATION_DATA SHOW_LAYER {
UNIQUE_INDEX_NUMBER=IDX_N
OBJECT_INSTENCE_NAME=layer_obj_IDX_N
ADD_SWITCH_CALLBACK=add_callback
SHOW_LAYER_SERVICE=show_layer
SWITCH_STATE_SERVICE=switch_state
}

COMPONENT_INTEGRATION_DATA is a unique reserved name. This data is coded into the CGM of the component CCG so that when CGM of the object is run, it generates the above data as comments in the presentation code.

Accessing the data is easy. The person who designs the container ICCG can design a special service method to search the keyword COMPONENT_INTEGRATION_DATA. Upon finding this tag, this special service method then gets the information such as component-class name and all the names of the service methods. The person then uses the information in writing the code of integration logic.

However, the use of the component integration data is not limited to the case where presentation code is stored in a file. It may be coded into the CGM of the any subcomponents and, the CGM of the subcomponent, upon being executed, generates component integration data as comments in presentation code of the component.

Apparently, all of the above methods may be used individually or in combination whenever possible. When integration is based upon abstract component class, the ICCG may further validate the component integration data.

Moreover, the ICCG may contain a special method for verifying component name and component integration data, and cause the program running the ICCG to take a proper action in case of error. This can help application developers to spot problems in case that an ICCG is given a wrong subcomponent or provided by the presentation code of a wrong type by a mistake.

9. Interaction Between ICCGs and Wrapper CCGs

A container ICCG may use a wrapper CCG to fetch the presentation code of a component from a remote server. The presentation code returned from the remote server may contain component integration data, which is used by the ICCG to integrate the subcomponent. The component integration data has to be coded into the CGM of the CCG of the component in the remote server so that the CCG object is able to return the component integration data when the wrapper CCG calls the CCG object in the remote server.

A wrapper CCG may call the remote CCG in a similar way discussed under ACCG. The wrapper CCG may also have a special service method for getting the presentation code of the remote CCG and a service method for searching for the reserved key word 'CLASS_COMPONENT_DATA'. When the wrapper CCG finds this data, it returns component integration data such as the names of the service methods and variables of the component to the container ICCG for use in integration. After getting the presentation code, the ICCG then copies the application code from the wrapper CCG to the application code page. The ICCG then uses the component data to generate integration code.

The wrapper CCG may perform additional functions. For example, it may process the component integration data and replaces the IDX_N with a unique index number or string to avoid variable name conflicts.

A wrapper CCG may be designed to fetch a component's presentation code from a file. The following statement may be used to call a Java object to loads the presentation code using the file name and the name of the component class as the second parameter for the component integration data shown in example Show_layer:

ComponentTemplate st=new ComponentTemplate(file_name, "SHOW_LAYER");

The object reads the "value" (e.g., the string) of the keyword after COMPONENT_INTEGRATION_DATA to determine whether the component class is of SHOW_LAYER. The object then gets the presentation code only if it is. Otherwise, the wrapper CCG flags errors and take appropriate action.

Through designing code, the wrapper CCG returns the names of the service methods of the presentation code to the container ICCG. The container ICCG may contain code to request the names of the service methods of the presentation code using the keywords as follows:

string switch_service=
st.getComponentService("SWITCH_STATE_SERVICE");

The container ICCG can use the actual name of the service method to generate integration code. This may return the name of the service method (e.g. layer_obj_IDX_N. switch_state) by combining object name, unique-id and name of the service method.

Instead of being stored in the tag-and-value pair data structure shown in the example, the component integration data may also be stored in other format such as an XML string, and placed the string in the comment section of the presentation code.

Example 14

Pseudo Code Showing Integration Using Component Integration Data

The following statement in the wrapper CCG may used to fetch the presentation code from a remote server using the URL and reads the value next to the tag or keyword COMPONENT_INTEGRATON_DATA to determine whether the component fetched from the remote server is of the type SHOPPING_ITEM_CLASS.

Items[I]=new ComponentTemplate(URL, "SHOPPING_ITEM_CLASS");

The statement gets the presentation code if the component in the remote server is a SHOPPING-ITEM-CLASS. Otherwise, it flags error and takes appropriate action. If the wrapper CCG gets the data successfully, it then gets the names of the service methods of the component, which is necessary to generate integration code.

The following statement in the ICCG may be used to get the names of the service methods of the component from the wrapper CCG by using predefined tag BUY_CALLBACK_REG:

String reg_name=Items[I].getComponentService("BUY_CALLBACK_REG");
out.println(""+reg_name+"(add_item_to_invoice);");

Assuming that the value stored in reg_name is 'item_obj_UNQ_ID.AddCallback', the above integration logic statement generates the following line of integration code in the presentation code, which integrates the component fetched from the remote server.

item_obj_UNQ_ID.AddCallback(add_item_to_invoice);

The above statement registers a callback 'add_item_to_invoice' for the Item subcomponent, where 'add_item_to_invoice' may be the service method of the Invoice/Table subcomponent.

This example shows how ICCG gets the component integration data from the CCG object in a remote server and uses the names of service methods defined in the component integration data to generate integration code.

9. Basic Consideration in Designing ICCGs

In order to use the method of the present invention, it is necessary to consider following issues:

The presentation code to be created by the ICCG should conform to the requirements of the all supported programming languages supported in the platform. Variable declaration, code grouping, calling methods between subcomponents, placement of subcomponent code, and incorporation of files should be proper for the platform.

The objective of designing reusable ICCGs is to build and test the ICCGs and the CCGs of imported subcomponents independently and allow ICCGs to take the CCG objects as subcomponents. The CCGs of the subcomponents may be derived from an abstract class to ensure its support for necessary component interface for getting integration data. If ICCGs are designed to use presentation code containing component integration data of subcomponents, a data validation method may be used in the ICCG, which causes the program to flag error or to exit if the subcomponent is not of a right type. An ICCG that directly uses subcomponent's presentation code (rather than CCG objects) should be designed so that it is able to detect the presentation code of subcomponents and use an appropriate method to get necessary integration data.

Subcomponents are placed in proper locations following the guideline for building ACCG. In coding an ICCG, it is also necessary to avoid creating integration code that uses variables and service methods before the variable and method names are defined in the application code. In the case where part of integration code is generated by the CCG objects of a subcomponent and the integration code of the subcomponent refers to any external function (e.g. callback functions), the code to generate the functions should appear before the code to call the CGM of the subcomponent.

A method of avoiding variable and method name conflict is necessary for building ICCG, as in building ACCG. In some situations, this method is not necessary if the names of variables and methods happen to be unique. In practice, it should be used to avoid potential conflicts. One of the implementations is to use a common utility object in the CCG of subcomponents, which can pick up a unique ID and append it to each of the global names in the application code. In the alternative, a global lookup table may be used and a name in conflict with any of the names, which have been docketed in the lookup table, is changed to be a unique name. A change is made for all instances of this name.

In building a reusable ICCG, it is necessary to know whether a subcomponent is of a suitable subcomponent for the container ICCG or whether one subcomponent can properly interact with another subcomponent.

One of the implementations discussed is to develop the ICCG to accept only CCG objects of the subcomponents that belong to specific abstract classes. All versions of CCGs capable of being integrated with the ICCG should belong to certain abstract classes the ICCG supports, and they are input to the ICCG using appropriate input method. The input methods may accept only objects that are subclass of the abstract class. Other implementation is that each of the CCG objects of subcomponents provides respective component integration data necessary for integration. Moreover, it is preferable for the ICCG to check and validate the component integration data for compatibility.

The ICCG should be designed so that it can be used as an input CCG to build a larger container component, making it possible to build component hierarchy conveniently.

When the ICCG directly implements application logic or call an ACCG having application logic, the ICCG and ACCG should be designed so that application data is initiated, processed, and updated before the component is rendered in the platform, thereby making it possible to present real-time data.

A data exchange mechanism is provided if the container component and subcomponents A and B need to exchange data during the execution of the presentation code of the container component. One of the data exchange mechanism is to use XML string. Alternatively, component data might be shared by using a common global variable. If presentation code is in HTML/DHTML, data may be exchanged by using hidden fields. Finally, a large amount of data may be exchanged though a file.

J. Creation of Component Hierarchy

Many methods are used to build component hierarchy.

(a). Building Container Component in Class Implementation

When container component is implemented in class, it can be used as subcomponent of another container ACCG or ICCG. CCGs that take the objects of replaceable subcomponents include Shopping-cart, Rotate-banner, Expandable-menu, Table, and Mouse-over popup for maps.

(b). Using GUI Controls to Build ACCGs

GUI environments such as X11/Motif in Linux and Unix operating systems or Microsoft Windows API (MSW-API) provide GUI elements such as buttons, lists, check boxes and menus, known as GUI controls. The instantiated objects of the CCGs for creating GUI Controls may be used as the building blocks of larger CCGs or ACCGs. The CCG objects generate presentation code, which renders the GUI elements. The presentation code generated by the component CCGs contains service methods and event notification methods.

Like the GUI for Windows, the presentation code of GUI Controls may have a rich set of class methods and variables to support many functionalities such as (i) handling user events and interactions, (ii) exporting service methods for external objects, which can use those methods to get (or set) data or access the services of the object of the control component, and (iii) allowing external objects to set callback functions to receive notification for certain events and notifies them using the given callback functions when the events happen.

(c). Building ACCGs for Use in Larger ACCGs as Subcomponents

The applications can be divided into many small ACCG. These ACCGs can be built and tested independently. Once the ACCGs are ready, they can be quickly assembled to form an application. By using this method, application developers can custom-build a web page and its components at run time for the requesting client using preferences or profile data.

By way of example, Hierarchical-menu may be used to build component hierarchy. Each cell of the Hierarchical-menu may be just a string variable or an object of more complicated component such as a pie chart or table. If an item passed to the Hierarchical-menu is web component code, the Hierarchical-menu class uses the CGM of the item to generate the component code. An instantiated hierarchical-menu object may be passed to other large component (such as a cell of another hierarchical-menu) as a subcomponent. This kind of component hierarchy could go on forever.

The Rotate-banner CCG (Appendix E) is a container component, which may be used as subcomponent by another container CCG. It takes an array of CCG objects of the subcomponents. The CCG, whose objects are used by Rotate-banner, may further use other CCG objects in building itself.

Theoretically, there is no limit in the size and complexity of the presentation code of the subcomponent. However, care must be taken for such items as coordinate system and the naming of the variables to avoid collision. In practice, very large and complex presentation code has been placed as subcomponents, and no severe limitations in Adobe's SVG viewer or Microsoft-IE5 have been observed for the presentation code in DHTML/JavaScript.

K. Use of the Method and System of the Present Invention

The method may be used to build a wide range of ICCGs that implement complex GUI-Metaphors such as On-Line Analytical Processing Cubes (OLAP-Cubes), shopping-carts, master-details tables for database applications, GPS-maps, and air-traffic control systems. Also, it is possible to support ICCGs for simulation of DNA/Genetic composition, visual representations of chemical formulas. ACCGs isolate and encapsulate the code for application logic so that they can be independently refined and easily replaced. The reusable ICCGs encapsulate the code of integration logic for integrating subcomponents using their component integration data, and automate the integration of subcomponents.

In the preferred embodiment of the present invention, Java is used on the server side and W3C's SVG and JavaScript is used on the client side. Other technologies such as .NET/C#, and XAML implemented in the Avalon subsystem of newer Windows Operating Systems can be used respectively to achieve the same goal.

Microsoft is developing a new presentation subsystem referred to as Avalon (a code name used in "Longhorn" Windows Operating System). Avalon provides the foundation for building applications and high fidelity experiences in Longhorn. To build a "Longhorn" application, application developers define the object model for the application and define the model programmatically by writing code or declaratorily by writing markup in a language called the Extensible Application Markup Language (XAML).

XML includes a feature known as the Document Object Model (DOM) which is an application programming interface (API) for HTML and XML documents. The DOM defines the logical structure of documents and the way the elements in a document is accessed and manipulated. The DOM allows programmers to build documents that may contain navigation structure and methods for adding, modifying, or delete elements and content. Many objects found in an HTML or XML document can be accessed, changed, deleted, or added using the DOM. Documents are modeled using objects, and the model encompasses not only the structure of a document, but also the behavior of a document and the objects of which it is composed. The DOM identifies the interfaces and objects used to represent and manipulate a document, the semantics of these interfaces and objects including both behavior and attributes, and the relationships and collaborations among these interfaces and objects. Therefore, this invention is intended to cover this method used under the Avalon subsystem. The XAML/WVG is expected to support similar or equivalent features of the XML based graphical elements.

This approach to declaring graphical elements is commonly referred to as declarative GUI programming. The XML based graphical technologies such as XHTML/DHTML, XAML/WVG, VML, X3D and SMIL fall under this category. They are ideally suited for representing or dynamically building complex component hierarchy in the XML Tree. Each sub tree in the XML tree may represent a component. The sub trees of the component tree represent its subcomponents, and so on. This tree of components may be programmatically created and dynamically manipulated.

The representation of graphical components may be independent of the code behind those components. The code behind the components makes them interactive, aware of the context, and intelligent. The ECMAscript code chucks (e.g., JavaScript) for the components may be placed along with the GUI-elements in the same XML file, or be placed in external files and be referenced by in the XML document. Both of these approaches conform to World Wide Web Consortium (W3C) specifications for the XML format. The CCGs may embed information such as names of service methods about external components in the generated presentation code. The Information may be used by the component in interacting with external components.

This invention uses these features of the XML-based declarative programming to create code-generating programs, which are ready to be assembled and/or integrated with other components. The code generated for the application component may comprise any of the supported technologies to present the component on platforms such as browsers, viewers or virtual machines, make the component interactive, and supports the methods of allowing external components to access the services of the component. Commercial browsers support many types of XML-graphical formats (or namespaces) in the web page document. For example, Netscape browser supports XUL and most of SVG 1.0. Likewise, Internet explorer 5.0+ supports Vector Markup Language (VML). Understanding the specifications of programming languages/technologies used in platforms, it is obvious to design CCGs, ACCGs, and ICCGs for any platform according to the teaching of this disclosure to achieve the same results. While most of the sample container CCGs are presented in the Java language, it is not so limited. If the ICCG is built in C++ or other programming languages proper in the developing platform, the CCG objects of subcomponents may be inputted to the container ICCG by any method supported in the languages. However, the different language may require the library of basic components for presenting them.

In those exemplary embodiments of the present invention, specific components, hardware parts, arrangements, and processes are used to describe the invention. Obvious changes, modifications, and substitutions may be made by those skilled in the art to achieve the same purpose of the invention. The exemplary embodiments are, of course, merely examples and are not intended to limit the scope of the invention. It is intended that the present invention include all other embodiments that are within the scope of the claims and their equivalents.

What is claimed is:

1. A system for presenting a container component in a web application containing other web elements using an executable program and at least one component code-generator for a subcomponent, the system comprising:
    a client computer having a processor, data bus, RAM, an accessible storage media, and a network interface and running a suitable operating system, the client computer further comprising means for rendering web pages;
    a server having a processor, data bus, RAM, a hard disk and a network interface and running a suitable operating system;
    a network connection between the server and the client computer, the network connection allowing for data exchange between the server and the client computer according to a communication protocol;
    storage means on the server for storing the executable program and the code of component code generator of the subcomponent, wherein the at least one component code generator is implemented in a class definition having plural variables, at least one service method, a code-generating method for generating the presentation code of the subcomponent, and the code for generating a service method of the subcomponent, and wherein the executable program contains code for instantiating or getting a class object of the component code generator of the subcomponent, code for calling the code-generating method of the class object, and code of integration logic;
    request means on the client computer for sending a request through the network connection to the server for the web page containing the component;
    first code-generating means for generating the presentation code of the subcomponent by getting or instantiating a class object of the component code generator of the subcomponent and executing the code-generating method of the class object;
    second code-generating means for generating integration code and other necessary code of the component by executing the code of integration logic in the executable program so that the executable program gets the name of the service method of the subcomponent from the class object and generates integration code using the name;
    delivery means for sending the web page containing the presentation code of the component to the client computer for rendering; and
    display means for rendering the presentation code of the component on the client computer.

2. The system of claim 1 wherein the executable program and the component code generator are derived from the same abstract class which implements a code-generating method, the system further comprising means for making the names of variables and names of service methods unique in the code of the container component.

3. The system of claim 2 wherein the first code-generating means generates presentation code for two subcomponents by running the class objects of two component code generators, respectively for two subcomponents; and wherein the second code-generating means generates integration code to integrate the two subcomponents or integrate one of the subcomponents with the container component.

4. The system of claim 2 wherein the client computer and the server reside on a same computer, and the network connection is the loopback of the computer.

5. The system of claim 2 wherein the presentation code of the component is substantially in XML-based graphic language, and the operating system of the client computer supports the graphic language.

6. The system of claim 2 further comprising means for using a global object to get unique strings and means for changing the names of the variables and the service methods by adding a unique string so that each of the names of the variables and the service methods is unique in the container component.

7. The system of claim 1 wherein the first code-generating means generates presentation code for two subcomponents by running the class objects of two component code generators, respectively for two subcomponents; and wherein the second code-generating means is able to generates integration code to integrate the two subcomponents or integrate one of the subcomponents with the container component.

8. The system of claim 7 further comprising means for logging the names of the variables and the service methods with a global lookup table and means for changing the names of the variables and the service methods so that each of the names of the variables and the service methods is unique in the container component.

9. The system of claim 7 further comprising means for using a global object to get unique strings and means for changing the names of the variables and the service methods by adding a unique string so that each of the names of the variables and the service methods is unique in the container component.

10. The system of claim 1 wherein the client computer and the server reside on a same computer, and the network connection is the loopback of the computer.

11. The system of claim 10 further comprising means for logging the names of the variables and the service methods with a global lookup table and means for changing the names of the variables and the service methods so that each of the names of the variables and the service methods is unique in the container component.

12. The system of claim 10 further comprising means for using a global object to get unique strings and means for changing the names of the variables and the service methods by adding a unique string so that each of the names of the variables and the service methods is unique in the container component.

13. The system of claim 1 wherein the presentation code of the component is substantially in XML-based graphic language, and the operating system of the client computer supports the graphic language.

14. The system of claim 1 further comprising means for logging the names of the variables and the service methods with a global lookup table and means for changing the names of the variables and the service methods so that each of the names of the variables and the service methods is unique in the container component.

15. The system of claim 1 further comprising means for using a global object to get unique strings and means for changing the names of the variables and the service methods by adding a unique string so that each of the names of the variables and the service methods is unique in the container component.

16. A method of creating a platform-compatible code for a component in a web page containing at least one subcomponent and other web elements, the code of the component being created by a web server using at least one subcomponent and being sent to the platform of the client computer for rendering through a network connection between the server and the client computer, the method comprising the steps of:
building a component code generator for the at least one subcomponent in an object class definition in a suitable programming language, the class supporting plural variables, at least one service method of the subcomponent, and a code-generating method;
saving the component code generator in the server's memory;
building an executable program in a suitable programming language, the executable program containing code for instantiating or getting a class object of the component code generator and code for instantiating the component code generator for the subcomponent;
running the executable program in response to a request for the web page from a client computer, the request containing the URL of the client computer and the specific information about the platform, the executable program performing the steps of:
(a) instantiating or getting a class object of the component code generator of the subcomponent;
(b) calling the code-generating method of the class object of the subcomponent to create the presentation code of the subcomponent;
(c) accessing the class object of the subcomponent to get the name of the service method of the subcomponent or picking up a name for a callback functions;
(d) generating integration code in application code; and
(e) generating the rest of presentation code for the container component;
sending the web page from the server to the client computer for rendering; and
displaying the web page on the client computer.

17. The method of claim 16 wherein one of the at least one component code generator of the subcomponent further comprises code of business logic encapsulated in the object class definition, and wherein the component code generator further includes code for acquiring real-time data and code for setting the values of the variables of the subcomponents before the code-generating method is called.

18. The method of claim 17 wherein the step of generating integration code further comprises creating the body of at least one callback function using the name of the service method in the subcomponent, and registering a callback, whereby the subcomponent is able to communicate with the component or one of the other web elements by using the callback function.

19. The method of claim 17 wherein the step of generating integration code further comprises writing part of integration code by the object of one of the component code generators by using its set method, creating the body of at least one callback function using the names of the service methods in the subcomponents, and registering the at least one callback functions, whereby the subcomponents are able to communicate with each other.

20. The method of claim 17 further comprising a step of attaching a unique string to each of the names of the variables and each of the names of the service methods so that all names are unique in the container component.

21. The method of claim 17 further comprising logging each of the names of the variables and the service methods in a global lookup table, and changing a name to be used in the resultant application code if the name is already logged in the global lookup table so that each of the names is unique in the code of the container component.

22. The method of claim 17 further comprising reading a file containing platform-specific information and using it in generating platform-specific information.

23. The method of claim 16 wherein the step of generating integration code further comprises creating the body of at least one callback function using the name of the service method, and registering a callback, whereby the subcomponent is able to communicate with the component or one of the other web elements by using the callback function.

24. The method of claim 23 wherein the step of generating integration code further comprises writing part of integration code by the component code generator object by using its set method.

25. The method of claim 23 further comprising a step of attaching a unique string to each of the names of the variables and each of the names of the service methods so that all names are unique in the container component.

26. The method of claim 23 further comprising logging each of the names of the variables and the service methods in a global lookup table, and changing a name to be used in the resultant application code if the name is already logged in the global lookup table so that each of the names is unique.

27. The method of claim 16 wherein the step of generating integration code further comprises writing part of integration code by the component code generator object by using its set method, creating the body of at least one callback function using the names of the service methods, and registering the callback functions, whereby the subcomponents are able to communicate with each other.

28. The method of claim 16 further comprising a step of attaching a unique string to each of the names of the variables and each of the names of the service methods so that all the names are unique.

29. The method of claim 16 further comprising logging each of the names of the variables and the service methods in a global lookup table, and changing a name to be used in the resultant application code if the name is already logged in the global lookup table so that each of the names is unique.

30. The method of claim 16 further comprising reading a file containing platform-specific information and using it in generating platform-specific information.

31. A method of creating the presentation code of a component in a web page containing at least one subcomponent and other web elements on a computer, the presentation code of the subcomponent being created by calling the code-generating method of a component code generator for the subcomponent, the application code being stored on the computer's memory or storage medium, the method comprising the steps of:
inputting or instantiating a class object of the component code generator of the subcomponent on the computer's memory;

calling the code-generating method of the class object of the component code generator of the subcomponent to generate the presentation code of the subcomponent;

accessing the class object of the subcomponent and getting the names of the service methods of the subcomponent or picking up a name for a callback function;

generating integration code for the component in the resultant application; and saving the resultant application on the computer's medium.

32. The method of claim 31 further comprising a step of attaching a string to each of the names of the variables and each of the names of the service methods so that all of the names are unique.

33. The method of claim 32 further comprising:

getting the component integration data from the class object of the component code generator of the subcomponent;

determining whether the subcomponent is a proper building block for the component; and using the component integration data in generating integration code.

34. The method of claim 31 further comprising logging each of the names of the variables and each of the names of the service methods of the subcomponent in a global lookup table, and changing a name to be used in the presentation code if the name is already logged in the global lookup table.

35. The method of claim 31 further comprising:

getting the component integration data from the class object of the component code generator of the subcomponent;

determining whether the subcomponent is a proper building block for the component; and using the component integration data in generating integration code.

36. The method of claim 31 further comprising the step of generating integration code further comprises creating the body of at least one callback function using the name of the service method, and registering the callback function.

37. A computer program product for use in a system of application development, the computer program product comprising a computer storage medium having computer program code embodied on the medium for integrating the presentation code of at least one subcomponent with the presentation code of a component on a web page, the computer program code further comprising:

program code for defining an abstract class which supports an abstract code-generating method;

program code of at least one executable component code generator which implements the code-generating method in the class definition;

program code for instantiating or setting the class object of the component code generator of the subcomponent;

program code for accessing and getting the names of the service methods of the subcomponent;

program code for generating integration code; and program code for generating the rest of presentation code of the component.

38. The computer program product of claim 37 wherein the program code of integration logic further comprises program code for getting the name of service methods of the subcomponents or program code to choose names for callback functions, program code for creating the bodies of callback functions, and program code for registering the callback functions.

39. The computer program product of claim 38 further comprising computer program code in the component-code generators of the subcomponent for affixing a unique string to each of the names of variables and each of the names of the service methods of the subcomponent so that all the names are unique.

40. The computer program product of claim 38 further comprising computer program code for logging each of the names of the variables and each of the names of the service methods in a global lookup table, and changing the name to be used in the application code if the name has been logged in the global lookup table.

41. The computer program product of claim 38 further comprising program code to implement business logic in the class definition of the component code generator.

42. The computer program product of claim 38 further comprising:

computer program code for generating the presentation code of plural subcomponents by calling the code-generating method of the component code generators; and computer program code for installing the computer program on a computer.

43. The computer program product of claim 38 further comprising program code for fetching the presentation code of a subcomponent from a remote server by calling an executable class object of a component code generator.

44. The computer program product of claim 37 further comprising computer program code in the component-code generators for affixing a unique string to each of the names of variables and each of the names of the service methods of the subcomponents so that all the names are unique.

45. The computer program product of claim 44 further comprising program code to implement business logic in the class definition of one of the component code generators.

46. The computer program product of claim 44 further comprising:

computer program code for generating the presentation code of plural subcomponents by calling the code-generating method of each of the component code generators; and computer program code for installing the computer program on a computer.

47. The computer program product of claim 37 further comprising computer program code for logging each of the names of the variables and each of the names of the service methods in a global lookup table, and changing the name to be used in the application code if a name has been logged in the global lookup table.

48. The computer program product of claim 47 further comprising program code for implementing business logic in the class definition of one of the component code generators.

49. The computer program product of claim 37 further comprising program code for implementing business logic in the class definition of one of the component code generators.

50. The computer program product of claim 37 further comprising:

computer program code for generating the presentation code of plural subcomponents by calling the code-generating method of each of the component code generators; and computer program code for installing the computer program on a computer.

51. The computer program product of claim 37 further comprising program code for fetching the presentation code of a subcomponent from a remote server by calling an executable class object of a component code generator.

52. A computer program product for use in a computer for application development, the computer program product comprising a computer storage medium having computer program code embodied on the medium for using at least one component code generator for a subcomponent to build the presentation code of a container component on a web page, the computer program code further comprising:
   program code for generating the presentation code of the subcomponent of the at least component code generator by calling the code-generating method; and
   program code for integrating the presentation code of the at least one subcomponent.

53. The computer program product of claim 52 wherein the program code for integrating the presentation code of the at least one subcomponents further comprises program code for getting the name of a service method of the subcomponent or program code for choosing a name for a callback function, program code for creating the body of the callback function, and program code for registering the callback function.

54. The computer program product of claim 53 wherein the program code for integrating the presentation code of the at least one subcomponent further comprises program code for creating a registration class object supporting a method of registering service, and method of looking up for service, and program code for creating code in one of the subcomponents for accessing service in another of the subcomponents.

55. The computer program product of claim 53 further comprising program code for preventing conflicts in the names of the variables and all the service methods of the at least one subcomponent in the container component.

56. The computer program product of claim 53 further comprising:
   program code for affixing a unique string to each of the names of the service methods for the at least one subcomponent so that the each of all the names of the service methods in the code of the container component is unique; and
   program code for affixing a unique string to each of the names of the variables of the at least one subcomponent in the presentation code so that each of all the names of the variables in the code of the container component is unique.

57. The computer program product of claim 53 further comprising program code for implementing abstract component class.

58. The computer program product of claim 53 further comprising program code for importing the presentation code of a remote subcomponent from a remote computer where the remote subcomponent is implemented in a class with a code-generating method and resides, as an executable program, in the RAM memory of the remote server, the program code being able to access the remote computer by sending a request containing the URL of the remote computer and being able to communicate with the remote computer according to an IP protocol, the program code grabbing the presentation code of the subcomponent by calling the code-generating method of the executable program.

59. The computer program product of claim 52, wherein the program code for integrating the presentation code further comprises program code for creating a global lookup table for storing the names of the service methods and the names of variables for each of the subcomponents, program code for writing each of the names of the service methods and each of the names of the variables for each of the subcomponents in the global lookup table, program code for verifying the names of the variables and the names of the service methods, and program code for modifying the names of the variables and the names of the service methods in the presentation code of each of the subcomponents in the container component.

60. The computer program product of claim 52 wherein the program code for integrating the presentation code of the at least one subcomponent further comprises, program code for creating a registration object supporting a method of registering services and method of looking up for service, and program code for creating code in one of the subcomponents for accessing services in another of the subcomponents.

61. The computer program product of claim 60 further comprising program code for preventing conflicts in the names of the variables and the service methods of the subcomponents in the container component.

62. The computer program product of claim 60 the program code for preventing conflicts further comprises:
   program code for affixing a unique string to each of the names of the service methods for each of the subcomponents so that the each of the names of all the service methods in the container component is unique; and
   program code for affixing a unique string to each of the names of the variables of the subcomponents in the presentation code so that each of the names of all the variables in the container component is unique.

63. The computer program product of claim 60 further comprising program code for implementing abstract component class.

64. The computer program product of claim 60 further comprising program code for importing the presentation code of a remote subcomponent from a remote computer where the remote subcomponent is implemented in a class with a code-generating method and resides in the RAM memory of the remote server as an executable program, the program code being able to access the remote computer by sending a request containing the URL of the remote computer and being able to communicate with the remote computer according to an IP protocol, the program code grabbing the presentation code of the subcomponent by calling the code-generating method of the executable program.

65. The computer program product of claim 52 further comprising program code for preventing conflicts in the names of the variables and the service methods of the subcomponents in the container component.

66. The computer program product of claim 65 wherein the program code for preventing name conflicts comprises:
   program code for affixing a unique string to each of the names of the service methods for each of the subcomponents so that the each of the names of all the service methods in the container component is unique; and
   program code for affixing a unique string to each of the names of the variables of the subcomponents in the presentation code so that each of the names of all the variables in the container component is unique.

67. The computer program product of claim 65 further comprising program code for implementing abstract component class.

68. The computer program product of claim 65 further comprising program code for importing the presentation code of a remote subcomponent from a remote computer where the remote subcomponent is implemented in a class with a code-generating method and resides in the RAM memory of the remote server as an executable program, the program code being able to access the remote computer by sending a request containing the URL of the remote computer and being able to communicate with the remote computer according to an IP protocol, the program code grabbing the presentation code of the subcomponent by calling the code-generating method of the executable program.

69. The computer program product of claim 52 further comprising:
   program code for affixing a unique string to each of the names of the service methods for each of the subcomponents so that the each of the names of all the service methods in the container component is unique; and program code for affixing a unique string to each of the names of the variables of the subcomponents in the presentation code so that each of the names of all the variables in the container component is unique.

70. The computer program product of claim 52 further comprising program code for implementing abstract component class.

71. The computer program product of claim 52 further comprising program code for importing the presentation code of a remote subcomponent from a remote computer where the remote subcomponent is implemented in a class with a code-generating method and resides in the RAM memory of the remote server as an executable program, the program code being able to access the remote computer by sending a request containing the URL of the remote computer and being able to communicate with the remote computer according to an IP protocol, the program code grabbing the presentation code of the remote subcomponent by calling the code-generating method of the executable program.

* * * * *